(12) United States Patent
Li et al.

(10) Patent No.: US 11,573,405 B2
(45) Date of Patent: Feb. 7, 2023

(54) OPTICAL IMAGING LENS ASSEMBLY INCLUDING EIGHT LENSES OF +-++--+- OR +---+-+- REFRACTIVE POWERS

(71) Applicant: Zhejiang Sunny Optical Co., Ltd, Ningbo (CN)

(72) Inventors: Yang Li, Ningbo (CN); Lingbo He, Ningbo (CN); Liefeng Zhao, Ningbo (CN); Fujian Dai, Ningbo (CN)

(73) Assignee: Zhejiang Sunny Optical Co., Ltd, Ningbo (CN)

( * ) Notice: Subject to any disclaimer, the term of this patent is extended or adjusted under 35 U.S.C. 154(b) by 297 days.

(21) Appl. No.: 16/990,051

(22) Filed: Aug. 11, 2020

(65) Prior Publication Data

US 2021/0063697 A1  Mar. 4, 2021

(30) Foreign Application Priority Data

Aug. 28, 2019 (CN) .......................... 201910804371.8

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
See application file for complete search history.

(56) References Cited

U.S. PATENT DOCUMENTS 11,460,675 B2 * 10/2022 Hirano ................. H04N 5/2254
2021/0018724 A1 * 1/2021 Hsu .......................... G02B 7/08

* cited by examiner

*Primary Examiner* — Wen Huang
(74) *Attorney, Agent, or Firm* — Sughrue Mion, PLLC

(57) ABSTRACT

The present disclosure discloses an optical imaging lens assembly including, sequentially from an object side to an image side along an optical axis, a first lens having positive refractive power with a convex object-side surface and a concave image-side surface; a second lens having negative refractive power with a concave image-side surface; a third lens having refractive power with a convex object-side surface and a concave image-side surface; a fourth lens having refractive power; a fifth lens having refractive power; a sixth lens having refractive power; a seventh lens having positive refractive power with a convex object-side surface; and an eighth lens having negative refractive power with a concave object-side surface and a concave image-side surface, wherein half of a diagonal length ImgH of an effective pixel area on an imaging plane of the optical imaging lens assembly satisfies: 5.80 mm<ImgH.

18 Claims, 9 Drawing Sheets

OPTICAL IMAGING LENS ASSEMBLY INCLUDING EIGHT LENSES OF +-++--+- OR +---+-+- REFRACTIVE POWERS

CROSS-REFERENCE TO RELATED APPLICATION

This application claims benefit of priority to Chinese Patent Application No. 201910804371.8 filed on Aug. 28, 2019 before the China National Intellectual Property Administration, the entire disclosure of which is incorporated herein by reference in its entity.

TECHNICAL FIELD

The present disclosure relates to an optical imaging lens assembly, and specifically, relates to an optical imaging lens assembly including eight lenses.

BACKGROUND

In recent years, with a rapid development of the portable electronic products, such as smart phones and tablet computers, people increasingly put forward a higher demand for the imaging lens assemblies mounted on portable electronic devices. On the one hand, people are continuously pursuing miniaturization and thinning of the portable electronic products. On the other hand, people require the imaging lens assemblies mounted on portable electronic devices to have a higher shooting clarity. This requires the optical imaging lens assembly, which is usable for the portable electronic products, to meet the requirements of miniaturization and high imaging quality. In addition, the traditional imaging lens assemblies with a small number of lenses are difficult to achieve large image plane characteristics, and cannot well meet the current people's requirements for daily shooting.

SUMMARY

The present disclosure provides an optical imaging lens assembly that is applicable to portable electronic products and at least solves or partially addresses at least one of the above disadvantages of the prior art.

In one aspect, the present disclosure provides an optical imaging lens assembly which includes, sequentially from an object side to an image side along an optical axis, a first lens having positive refractive power, an object-side surface thereof is a convex surface, and an image-side surface thereof is a concave surface; a second lens having negative refractive power, and an image-side surface thereof is a concave surface; a third lens having refractive power, an object-side surface thereof is a convex surface, and an image-side surface thereof is a concave surface; a fourth lens having refractive power; a fifth lens having refractive power; a sixth lens having refractive power; a seventh lens having positive refractive power, and an object-side surface thereof is a convex surface; and an eighth lens having negative refractive power, an object-side surface thereof is a concave surface, and an image-side surface thereof is a concave surface.

In one embodiment, the optical imaging lens assembly may further include a stop disposed between the object side and the first lens.

In one embodiment, half of a diagonal length ImgH of an effective pixel area on an imaging plane of the optical imaging lens assembly may satisfy: 5.80 mm<ImgH.

In one embodiment, an effective focal length f7 of the seventh lens and a total effective focal length f of the optical imaging lens assembly may satisfy: 1.00<f7/f<2.00.

In one embodiment, a distance TTL along the optical axis from the object-side surface of the first lens to an imaging plane of the optical imaging lens assembly and half of a diagonal length ImgH of an effective pixel area on the imaging plane of the optical imaging lens assembly may satisfy: TTL/ImgH<1.10.

In one embodiment, a radius of curvature R13 of the object-side surface of the seventh lens and a radius of curvature R16 of the image-side surface of the eighth lens may satisfy: 0.50<R16/R13<2.00.

In one embodiment, a radius of curvature R2 of the image-side surface of the first lens and a total effective focal length f of the optical imaging lens assembly may satisfy: 1.00<R2/f<3.50.

In one embodiment, a center thickness CT4 of the fourth lens along the optical axis and a spaced interval T45 between the fourth lens and the fifth lens along the optical axis may satisfy: 2.00<CT4/T45<5.00.

In one embodiment, a radius of curvature R2 of the image-side surface of the first lens and a radius of curvature R4 of the image-side surface of the second lens may satisfy: 2.00<(R4+R2)/(R2−R4)<5.00.

In one embodiment, a center thickness CT5 of the fifth lens along the optical axis and a center thickness CT7 of the seventh lens along the optical axis may satisfy: 3.00<(CT5+CT7)/(CT7−CT5)<7.00.

In one embodiment, SAG61, being an on-axis distance from an intersection of an object-side surface of the sixth lens and the optical axis to a vertex of an effective radius of the object-side surface of the sixth lens, and SAG62, being an on-axis distance from an intersection of an image-side surface of the sixth lens and the optical axis to a vertex of an effective radius of the image-side surface of the sixth lens, may satisfy: 9.00<(SAG62+SAG61)/(SAG62−SAG61)<20.00.

In one embodiment, a maximum effective radius DT82 of the image-side surface of the eighth lens and half of a diagonal length ImgH of an effective pixel area on an imaging plane of the optical imaging lens assembly may satisfy: 0.74<DT82/ImgH.

In one embodiment, a sum of spaced intervals ΣAT along the optical axis between each two adjacent lenses of the first lens to the eighth lens and a distance TD along the optical axis from the object-side surface of the first lens to the image-side surface of the eighth lens may satisfy: ΣAT/TD<0.40.

The optical imaging lens assembly provided by the present disclosure includes a plurality of lenses, for example, the first lens to the eighth lens. By reasonably setting the proportional relationship between the distance along the optical axis from the object-side surface of the first lens to the imaging plane of the optical imaging lens assembly and half of the diagonal length of the effective pixel area on the imaging plane of the optical imaging lens assembly, and optimizing the refractive power and surface shape of each lens to match each other reasonably, the optical imaging lens assembly lens is miniaturized, lighter and thinner, and has a larger imaging plane and high imaging definition.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
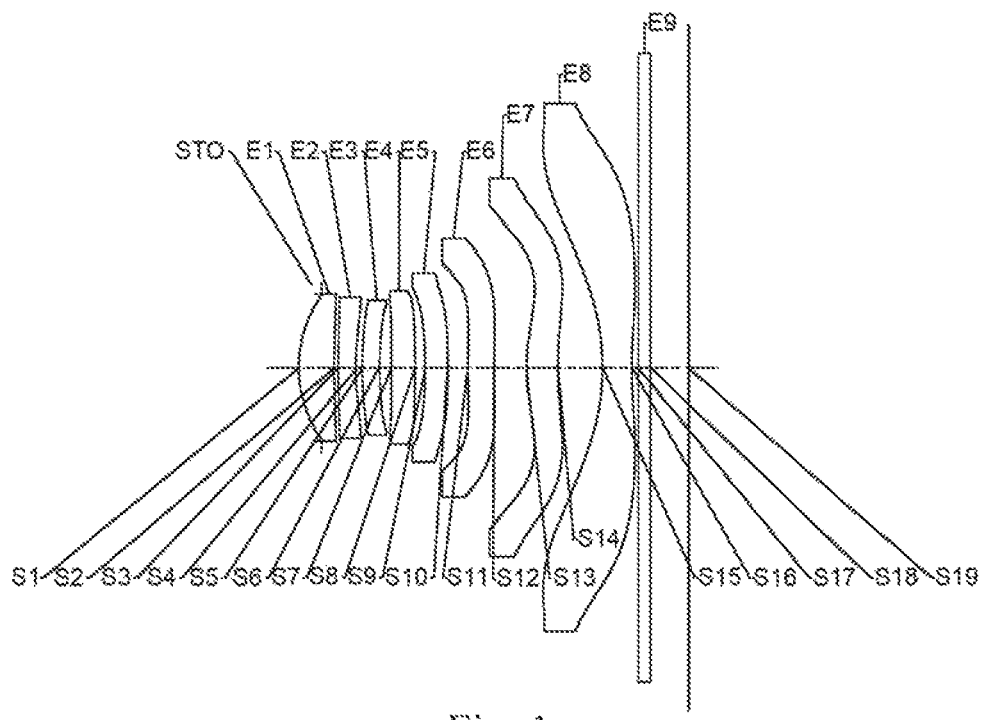
FIG. 1 illustrates a schematic structural view of an optical imaging lens assembly according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging lens assembly according to an exemplary embodiment of the present disclosure may include eight lenses having refractive power, which are a first lens, a second lens, a third lens, a fourth lens, a fifth lens, a sixth lens, a seventh lens and an eighth lens. The eight lenses are arranged sequentially from an object side to an image side along an optical axis. There may be an air interval between respective adjacent lenses.

In an exemplary embodiment, the first lens may have positive refractive power, an object-side surface thereof is a convex surface, and an image-side surface thereof is a concave surface; the second lens may have negative refractive power, and an image-side surface thereof is a concave surface; the third lens has positive or negative refractive power, an object-side surface thereof is a convex surface, and an image-side surface thereof is a concave surface; the fourth lens has positive or negative refractive power; the fifth lens has positive or negative refractive power; the sixth lens has positive or negative refractive power; the seventh lens may have positive refractive power, and an object-side surface thereof is a convex surface; and the eighth lens may have negative refractive power, an object-side surface thereof is a concave surface, and an image-side surface thereof is a concave surface. Reasonably configuring the refractive power and surface shape of each lens of the optical system may effectively compensate the aberration of the optical system, thereby improving the image quality.

In an exemplary embodiment, a distance TTL along the optical axis from the object-side surface of the first lens to an imaging plane of the optical imaging lens assembly and half of a diagonal length ImgH of an effective pixel area on the imaging plane of the optical imaging lens assembly may satisfy: TTL/ImgH<1.10, specifically, 1.0<TTL/ImgH<1.10. Reasonably setting the proportional relationship between the distance along the optical axis from the object-side surface of the first lens to the imaging plane of the optical imaging lens assembly and half of the diagonal length of the effective pixel area on the imaging plane of the optical imaging lens assembly is beneficial to achieve a lighter and thinner optical imaging lens assembly and a larger imaging plane.

In an exemplary embodiment, half of a diagonal length ImgH of an effective pixel area on an imaging plane of the optical imaging lens assembly may satisfy: 5.80 mm<ImgH, specifically, 5.80 mm<ImgH<5.90 mm. Satisfying 5.80 mm<ImgH, the optical imaging lens assembly has a larger imaging plane and may have a higher resolution.

In an exemplary embodiment, an effective focal length f7 of the seventh lens and a total effective focal length f of the optical imaging lens assembly may satisfy: 1.00<f7/f<2.00, specifically, 1.00<f7/f<1.60. Reasonably setting the proportional relationship between the effective focal length of the seventh lens and the total effective focal length of the optical imaging lens assembly may ensure that the optical system has high aberration correction capabilities. At the same time, satisfying the above proportional relationship is also beneficial to control the size of the optical imaging lens assembly and avoid excessive concentration of the refractive power of the lens assembly. With other lenses, the aberration of the lens assembly can be better corrected.

In an exemplary embodiment, a radius of curvature R13 of the object-side surface of the seventh lens and a radius of curvature R16 of the image-side surface of the eighth lens may satisfy: 0.50<R16/R13<2.00, specifically, 0.80<R16/R13<2.00. Reasonably setting the proportional relationship between the radius of curvature of the object-side surface of the seventh lens and the radius of curvature of the image-side surface of the eighth lens is beneficial to control the distortion of the optical imaging lens assembly to be within an acceptable range to obtain better imaging quality.

In an exemplary embodiment, a radius of curvature R2 of the image-side surface of the first lens and a total effective focal length f of the optical imaging lens assembly may satisfy: 1.00<R2/f<3.50, specifically, 1.60<R2/f<3.10. The ratio of the radius of curvature of the image-side surface of the first lens to the total effective focal length of the optical imaging lens assembly is set to be within a reasonable value range, which is beneficial for the object side end of the optical imaging lens assembly to have sufficient light converging ability to adjust the focus position of the beam, thereby effectively shortening the overall length of the optical imaging lens assembly.

In an exemplary embodiment, a center thickness CT4 of the fourth lens along the optical axis and a spaced interval T45 between the fourth lens and the fifth lens along the optical axis may satisfy: 2.00<CT4/T45<5.00, specifically, 2.40<CT4/T45<4.60. By reasonably setting the proportional relationship between the center thickness of the fourth lens along the optical axis and the spaced interval between the fourth lens and the fifth lens along the optical axis, it is not only beneficial to uniform the distribution of lens in size and ensure the stability of lens assembly, but also reduce the aberration of the entire optical system and shorten the overall length of the optical imaging lens assembly.

In an exemplary embodiment, a radius of curvature R2 of the image-side surface of the first lens and a radius of curvature R4 of the image-side surface of the second lens may satisfy: 2.00<(R4+R2)/(R2−R4)<5.00, specifically, 2.30<(R4+R2)/(R2−R4)<4.90. Reasonably configuring the radius of curvature of the image-side surface of the first lens and the radius of curvature of the image-side surface of the second lens is beneficial to correct the chromatic aberration of the optical imaging lens assembly, and at the same time, is beneficial to achieve the correction of various aberrations.

In an exemplary embodiment, a center thickness CT5 of the fifth lens along the optical axis and a center thickness CT7 of the seventh lens along the optical axis may satisfy: 3.00<(CT5+CT7)/(CT7−CT5)<7.00, specifically, 3.40<(CT5+CT7)/(CT7−CT5)<7.00. By reasonably setting the proportional relationship between the center thickness of the fifth lens along the optical axis and the center thickness of the seventh lens along the optical axis, it is not only beneficial to reasonably control the space ratio of the fifth lens and the seventh lens and ensure the assembly process of the optical imaging lens assembly, but also achieve the miniaturization of the optical imaging lens assembly.

In an exemplary embodiment, an on-axis distance SAG61 from an intersection of an object-side surface of the sixth lens and the optical axis to a vertex of an effective radius of the object-side surface of the sixth lens and an on-axis distance SAG62 from an intersection of an image-side surface of the sixth lens and the optical axis to a vertex of an effective radius of the image-side surface of the sixth lens may satisfy: 9.00<(SAG62+SAG61)/(SAG62−SAG61)<20.00, specifically, 9.40<(SAG62+SAG61)/(SAG62−SAG61)<19.70. By reasonably setting the proportional relationship between the on-axis distance from the intersection of the object-side surface of the sixth lens and the optical axis to the vertex of the effective radius of the object-side surface of the sixth lens and the on-axis distance from the intersection of the image-side surface of the sixth lens and the optical axis to the vertex of the effective radius of the image-side surface of the sixth lens, it is beneficial to adjust the chief ray angle of the optical imaging lens assembly, which may effectively increase the relative brightness of the optical imaging lens assembly and improve the image clarity.

In an exemplary embodiment, a maximum effective radius DT82 of the image-side surface of the eighth lens and half of a diagonal length ImgH of an effective pixel area on an imaging plane of the optical imaging lens assembly may satisfy: 0.74<DT82/ImgH, specifically, 0.74<DT82/ImgH<0.80. By reasonably setting the proportional relationship between the maximum effective radius of the image-side surface of the eighth lens and half of the diagonal length of the effective pixel area on the imaging plane of the optical imaging lens assembly, it is beneficial to reduce the size of the lens assembly while the optical imaging lens assembly has the characteristics of a large image plane.

In an exemplary embodiment, a sum of spaced intervals EAT along the optical axis between each two adjacent lenses of the first lens to the eighth lens and a distance TD along the optical axis from the object-side surface of the first lens to the image-side surface of the eighth lens may satisfy: $\Sigma AT/TD<0.40$, specifically, $0.35<\Sigma AT/TD<0.40$. By controlling the ratio of the sum of spaced intervals along the optical axis between each two adjacent lenses of the first lens to the eighth lens to the distance along the optical axis from the object-side surface of the first lens to the image-side surface of the eighth lens to be less than 0.4, it is not only beneficial to reasonably control the interval between the surfaces of the lenses, so as to avoid excessive deflection of the light, but also reduce the processing difficulty of the optical imaging lens assembly.

In an exemplary embodiment, the optical imaging lens assembly described above may further include stop. The stop may be disposed at an appropriate position as needed, for example, between the object side and the first lens. Optionally, the above optical imaging lens assembly may further include an optical filter for correcting the color deviation and/or a protective glass for protecting the photosensitive element located on an imaging plane.

The present disclosure provides an optical imaging lens assembly with the characteristics of large image plane, high resolution, ultra-thinness and the like. The optical imaging lens assembly according to the above embodiments of the present disclosure may employ a plurality of lenses, such as eight lenses as described above. By properly configuring the refractive power of each lens, the surface shape, the center thickness of each lens, and spaced intervals along the optical axis between the lenses, the incident light may be effectively converged, the total optical length of the imaging lens assembly may be reduced, and the workability of the imaging lens assembly may be improved, such that the optical imaging lens assembly is more advantageous for production processing.

In an exemplary embodiment, at least one of the surfaces of lenses is aspheric, that is, at least one of the object-side surface of the first lens to the image-side surface of the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens, the seventh lens and the eighth lens is aspheric. Optionally, the object-side surface and the image-side surface of each of the first lens, the second lens, the third lens, the fourth lens, the fifth lens, the sixth lens, the seventh lens and the eighth lens are aspheric.

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens assembly described above.

However, it will be understood by those skilled in the art that the number of lenses constituting the optical imaging lens assembly may be varied to achieve the various results and advantages described in this specification without departing from the technical solution claimed by the present disclosure. For example, although the embodiment is described by taking eight lenses as an example, the optical imaging lens assembly is not limited to include eight lenses. The optical imaging lens assembly may also include other numbers of lenses if desired.

Some specific examples of an optical imaging lens assembly applicable to the above embodiment will be further described below with reference to the accompanying drawings.

Example 1

An optical imaging lens assembly according to example 1 of the present disclosure is described below with reference to FIG. 1 to FIG. 2D. FIG. 1 is a schematic structural view of the optical imaging lens assembly according to example 1 of the present disclosure.

As shown in FIG. 1, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a convex surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

Table 1 is a table illustrating basic parameters of the optical imaging lens assembly of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.3949 | | | | |
| S1 | Aspheric | 2.0919 | 0.6058 | 1.55 | 56.1 | 4.76 | −0.1272 |
| S2 | Aspheric | 9.6219 | 0.0758 | | | | −94.6475 |
| S3 | Aspheric | 12.9663 | 0.3000 | 1.67 | 20.4 | −11.66 | −99.0000 |
| S4 | Aspheric | 4.8101 | 0.1081 | | | | −46.8099 |
| S5 | Aspheric | 5.4744 | 0.3000 | 1.67 | 20.4 | 53.68 | −2.3828 |
| S6 | Aspheric | 6.3231 | 0.1994 | | | | 13.5762 |
| S7 | Aspheric | 92.4835 | 0.4165 | 1.55 | 56.1 | 22.74 | −99.0000 |
| S8 | Aspheric | −14.3178 | 0.1669 | | | | 49.1183 |
| S9 | Aspheric | −9.6018 | 0.3871 | 1.62 | 23.5 | −21.87 | 41.5740 |
| S10 | Aspheric | −30.7048 | 0.3466 | | | | −90.3923 |
| S11 | Aspheric | 12.4081 | 0.4508 | 1.67 | 20.4 | −69.74 | −17.6917 |
| S12 | Aspheric | 9.6491 | 0.5553 | | | | −6.5568 |
| S13 | Aspheric | 3.0966 | 0.5402 | 1.55 | 56.1 | 9.03 | −11.2095 |
| S14 | Aspheric | 7.8079 | 0.7651 | | | | −4.0029 |
| S15 | Aspheric | −4.7066 | 0.5000 | 1.54 | 55.9 | −4.81 | −0.0520 |
| S16 | Aspheric | 5.9336 | 0.1174 | | | | −31.0538 |
| S17 | Spherical | Infinite | 0.2100 | 1.52 | 64.2 | | |
| S18 | Spherical | Infinite | 0.6550 | | | | |
| S19 | Spherical | Infinite | | | | | |

In this example, a total effective focal length f of the optical imaging lens assembly satisfies f=5.98 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=43.1° and an aperture number Fno of the optical imaging lens assembly satisfies Fno=2.38.

In example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1 + \sqrt{1 - (k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

TABLE 2

| Surface number | A4 | A6 | A8 | A10 | A12 |
|---|---|---|---|---|---|
| S1 | −5.4859E−04 | −5.4631E−03 | 2.1986E−02 | −5.8712E−02 | 9.0736E−02 |
| S2 | −1.3338E−02 | 1.4414E−02 | −6.8589E−02 | 1.9237E−01 | −3.2776E−01 |
| S3 | −1.5737E−02 | 1.7042E−02 | −6.1473E−02 | 1.4473E−01 | −2.2419E−01 |
| S4 | 3.8511E−02 | −5.4449E−02 | 3.6821E−02 | −7.9497E−02 | 1.5315E−01 |
| S5 | −2.1181E−02 | 2.3272E−03 | −8.0976E−03 | 5.7426E−04 | 1.9454E−02 |
| S6 | −1.8144E−02 | 1.0174E−02 | −3.2428E−02 | 1.4686E−01 | −3.1590E−01 |
| S7 | 8.3027E−05 | −2.9359E−02 | 7.1795E−02 | −2.1537E−01 | 4.0395E−01 |
| S8 | 1.8034E−02 | −2.4543E−02 | 5.8504E−03 | 6.6601E−03 | −1.9937E−02 |
| S9 | −1.5738E−02 | 1.1863E−02 | −1.0163E−01 | 2.3838E−01 | −3.1510E−01 |
| S10 | −3.7375E−02 | −2.9621E−04 | −8.5883E−03 | 8.8689E−03 | −2.5185E−04 |
| S11 | −5.6058E−02 | 1.9753E−02 | −4.0892E−03 | −1.7633E−02 | 1.9797E−02 |
| S12 | −7.2998E−02 | 3.8383E−02 | −1.4797E−02 | 9.6141E−04 | 1.4635E−03 |
| S13 | 2.2214E−03 | −3.0141E−02 | 1.4551E−02 | −4.2019E−03 | 7.9042E−04 |
| S14 | 1.8284E−02 | −3.2808E−02 | 1.4104E−02 | −3.6573E−03 | 6.1303E−04 |
| S15 | −2.5517E−02 | 1.3949E−02 | −3.4159E−03 | 4.9878E−04 | −4.5328E−05 |
| S16 | −3.2229E−02 | 1.1032E−02 | −2.3566E−03 | 3.1676E−04 | −2.7613E−05 |

| Surface number | A14 | A16 | A18 | A20 |
|---|---|---|---|---|
| S1 | −8.6074E−02 | 4.8974E−02 | −1.5329E−02 | 2.0177E−03 |
| S2 | 3.5269E−01 | −2.3224E−01 | 8.4880E−02 | −1.3159E−02 |
| S3 | 2.3434E−01 | −1.5859E−01 | 6.1798E−02 | −1.0396E−02 |
| S4 | −1.7061E−01 | 1.0557E−01 | −3.1414E−02 | 2.9367E−03 |
| S5 | 8.4129E−03 | −4.2442E−02 | 3.3753E−02 | −8.8407E−03 |
| S6 | 4.4500E−01 | −3.7265E−01 | 1.6729E−01 | −3.0926E−02 |

TABLE 2-continued

| | | | | |
|---|---|---|---|---|
| S7 | −4.6500E−01 | 3.2967E−01 | −1.3354E−01 | 2.3733E−02 |
| S8 | 1.9579E−02 | −8.7810E−03 | 1.3406E−03 | −1.2034E−06 |
| S9 | 2.5552E−01 | −1.2469E−01 | 3.3885E−02 | −4.0349E−03 |
| S10 | −4.9254E−03 | 4.0243E−03 | −1.3087E−03 | 1.5285E−04 |
| S11 | −1.1269E−02 | 3.7452E−03 | −6.7710E−04 | 5.1655E−05 |
| S12 | −6.6794E−04 | 1.4419E−04 | −1.6636E−05 | 8.1811E−07 |
| S13 | −1.0170E−04 | 9.2611E−06 | −5.4882E−07 | 1.5305E−08 |
| S14 | −6.7197E−05 | 4.7167E−06 | −1.9371E−07 | 3.5351E−09 |
| S15 | 2.6040E−06 | −9.2368E−08 | 1.8524E−09 | −1.6090E−11 |
| S16 | 1.5483E−06 | −5.3629E−08 | 1.0439E−09 | −8.7520E−12 |

Figure 2A:
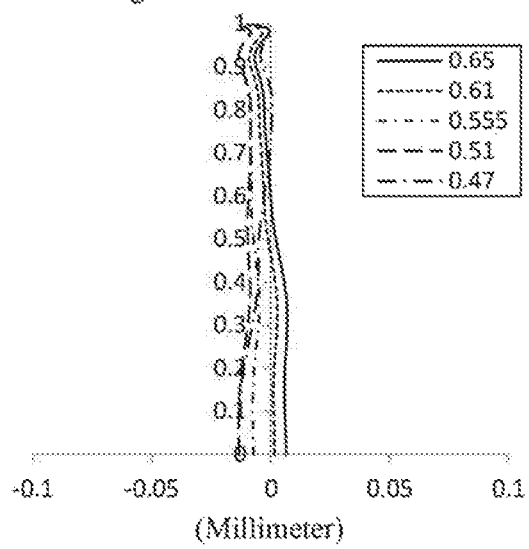
FIGS. 2A to 2D illustrate a longitudinal aberration curve, an astigmatic curve, a distortion curve, and a lateral color curve of the optical imaging lens assembly of the Example 1, respectively.
Figure 2B:
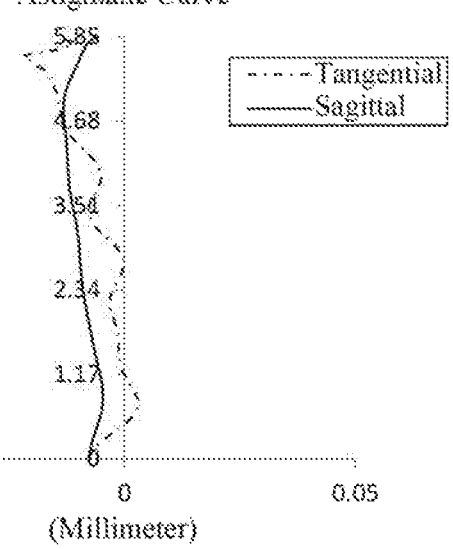
Figure 2C:
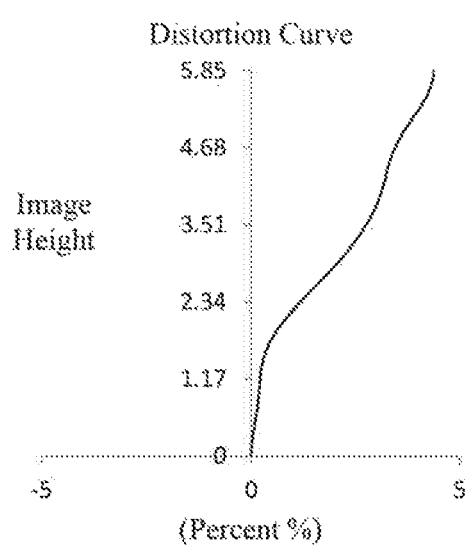
Figure 2D:
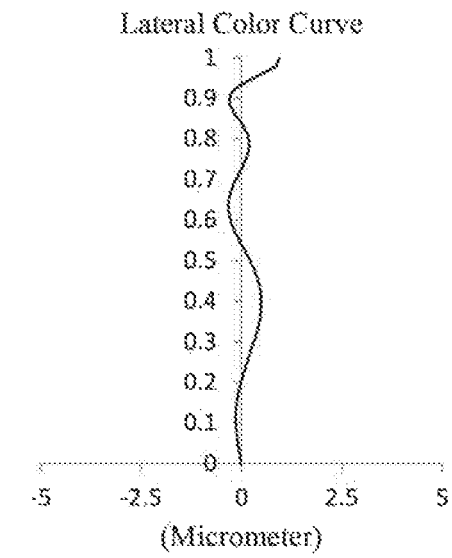

FIG. 2A illustrates a longitudinal aberration curve of the optical imaging lens assembly according to example 1, representing deviations of focal points converged by light of different wavelengths after passing through the lens assembly. FIG. 2B illustrates an astigmatic curve of the optical imaging lens assembly according to example 1, representing a curvature of a tangential plane and a curvature of a sagittal plane. FIG. 2C illustrates a distortion curve of the optical imaging lens assembly according to example 1, representing amounts of distortion corresponding to different image heights. FIG. 2D illustrates a lateral color curve of the optical imaging lens assembly according to example 1, representing deviations of different image heights on an imaging plane after light passes through the lens assembly. It can be seen from FIG. 2A to FIG. 2D that the optical imaging lens assembly provided in example 1 may achieve good image quality.

Example 2

Figure 3:
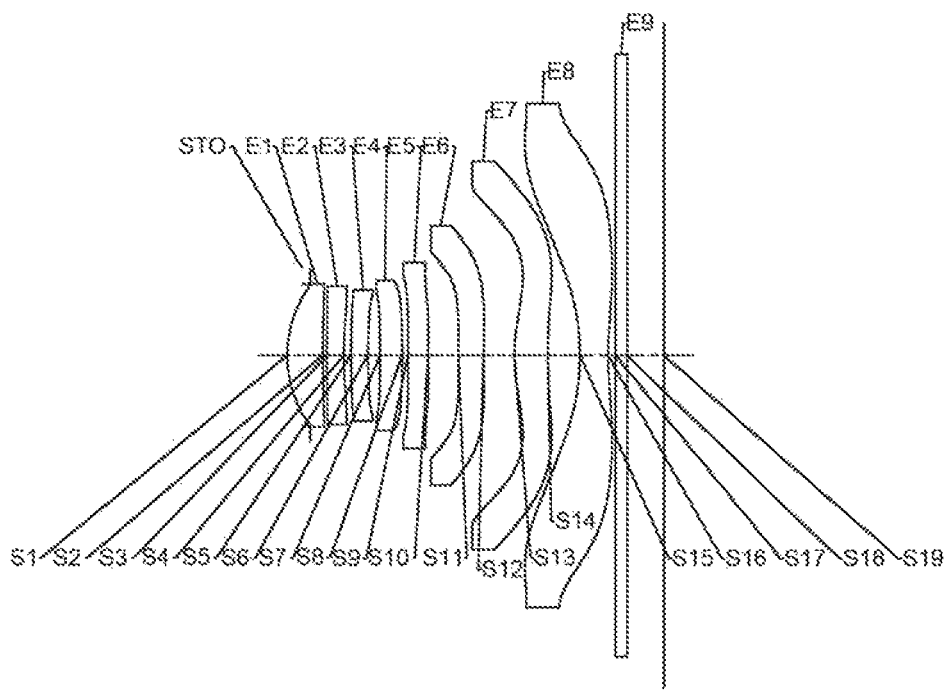
FIG. 3 illustrates a schematic structural view of an optical imaging lens assembly according to Example 2 of the present disclosure.

An optical imaging lens assembly according to example 2 of the present disclosure is described below with reference to FIG. 3 to FIG. 4D. FIG. 3 shows a schematic structural view of the optical imaging lens assembly according to example 2 of the present disclosure.

As shown in FIG. 3, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=6.01 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=42.5°, and an aperture number Fno of the optical imaging lens assembly satisfies Fno=2.38.

Table 3 is a table illustrating basic parameters of the optical imaging lens assembly of example 2, wherein the units for the radius of curvature, the thickness/distance and the focal length are millimeter (mm).

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.4086 | | | | |
| S1 | Aspheric | 2.0787 | 0.6294 | 1.55 | 56.1 | 4.37 | −0.0756 |
| S2 | Aspheric | 14.3323 | 0.0764 | | | | −71.7441 |
| S3 | Aspheric | 24.0101 | 0.3000 | 1.67 | 20.4 | −12.44 | −13.9225 |
| S4 | Aspheric | 6.1256 | 0.1257 | | | | −91.8946 |
| S5 | Aspheric | 9.9386 | 0.3000 | 1.67 | 20.4 | 5690.19 | −13.4949 |
| S6 | Aspheric | 9.8445 | 0.2216 | | | | 25.5465 |
| S7 | Aspheric | −20.0000 | 0.3934 | 1.55 | 56.1 | 195.39 | −19.3323 |
| S8 | Aspheric | −16.9592 | 0.1000 | | | | 50.0000 |
| S9 | Aspheric | 20.0000 | 0.3568 | 1.62 | 23.5 | −1744.94 | −99.0000 |
| S10 | Aspheric | 19.5127 | 0.5371 | | | | 50.0000 |
| S11 | Aspheric | 17.9997 | 0.4517 | 1.67 | 20.4 | −24.33 | 13.9280 |
| S12 | Aspheric | 8.4407 | 0.5465 | | | | −78.8120 |

TABLE 3-continued

| Surface number | Surface type | Radius of curvature | Thickness/ Distance | Material Refractive index | Abbe number | Focal length | Conic coefficient |
|---|---|---|---|---|---|---|---|
| S13 | Aspheric | 3.0422 | 0.5908 | 1.55 | 56.1 | 7.62 | −9.8149 |
| S14 | Aspheric | 10.5349 | 0.5738 | | | | −3.3015 |
| S15 | Aspheric | −4.7377 | 0.5000 | 1.54 | 55.9 | −4.48 | −0.0533 |
| S16 | Aspheric | 5.0524 | 0.1313 | | | | −34.6646 |
| S17 | Spherical | Infinite | 0.2100 | 1.52 | 64.2 | | |
| S18 | Spherical | Infinite | 0.6555 | | | | |
| S19 | Spherical | Infinite | | | | | |

In example 2, the object-side surface and the image-side surface of any one of the first lens E1 to the eighth lens E8 are aspheric. Table 4 below shows high-order coefficients A4, A6, A8, A10, A12, A14, A16, A18 and A20 applicable to each aspheric surface S1 to S16 in example 2.

TABLE 4

| Surface number | A4 | A6 | A8 | A10 | A12 |
|---|---|---|---|---|---|
| S1 | 8.7678E−04 | −5.2289E−03 | 2.1172E−02 | −5.3867E−02 | 8.1886E−02 |
| S2 | −1.1688E−02 | 1.1172E−02 | −3.4758E−02 | 8.8274E−02 | −1.4780E−01 |
| S3 | −1.6459E−02 | 1.2860E−02 | −3.1121E−02 | 7.5890E−02 | −1.2080E−01 |
| S4 | 2.5584E−02 | −6.7342E−02 | 8.1418E−02 | −1.1961E−01 | 1.8596E−01 |
| S5 | −2.5461E−02 | −1.2737E−02 | 2.7203E−02 | −4.9226E−02 | 1.3682E−01 |
| S6 | −5.3650E−03 | −4.6258E−03 | 1.9380E−02 | −1.5608E−02 | 5.1577E−02 |
| S7 | 9.8479E−03 | −1.6721E−02 | −6.5018E−02 | 2.1642E−01 | −4.1982E−01 |
| S8 | −8.1898E−03 | 6.7149E−02 | −2.2502E−01 | 3.9403E−01 | −4.6917E−01 |
| S9 | −7.2964E−02 | 1.2606E−01 | −2.8104E−01 | 4.4620E−01 | −4.7900E−01 |
| S10 | −7.3570E−02 | 7.8678E−02 | −1.2700E−01 | 1.5348E−01 | −1.2490E−01 |
| S11 | −8.6702E−02 | 6.2724E−02 | −4.3908E−02 | 1.1812E−02 | 3.2818E−03 |
| S12 | −9.3239E−02 | 7.2698E−02 | −4.6163E−02 | 2.0349E−02 | −6.4833E−03 |
| S13 | −1.3440E−02 | −8.3161E−03 | 2.2329E−03 | −2.5865E−04 | 2.1826E−05 |
| S14 | 1.9413E−02 | −2.2628E−02 | 7.4236E−03 | −1.5108E−03 | 2.0750E−04 |
| S15 | −2.5243E−02 | 1.3872E−02 | −3.4134E−03 | 5.0667E−04 | −4.7355E−05 |
| S16 | −2.7752E−02 | 8.0702E−03 | −1.4352E−03 | 1.5516E−04 | −1.0419E−05 |

| Surface number | A14 | A16 | A18 | A20 |
|---|---|---|---|---|
| S1 | −7.8291E−02 | 4.5450E−02 | −1.4668E−02 | 2.0008E−03 |
| S2 | 1.5720E−01 | −1.0176E−01 | 3.6104E−02 | −5.3375E−03 |
| S3 | 1.2602E−01 | −8.3186E−02 | 3.0990E−02 | −4.8823E−03 |
| S4 | −2.0201E−01 | 1.2977E−01 | −4.4599E−02 | 6.2770E−03 |
| S5 | −1.8564E−01 | 1.2730E−01 | −4.4088E−02 | 6.0281E−03 |
| S6 | −6.2418E−02 | 2.8411E−02 | −6.5652E−04 | −2.0222E−03 |
| S7 | 5.0976E−01 | −3.7548E−01 | 1.5234E−01 | −2.5978E−02 |
| S8 | 3.7176E−01 | −1.8747E−01 | 5.4104E−02 | −6.8193E−03 |
| S9 | 3.4295E−01 | −1.5528E−01 | 3.9901E−02 | −4.4458E−03 |
| S10 | 6.7738E−02 | −2.2629E−02 | 4.1246E−03 | −3.1181E−04 |
| S11 | −4.3357E−03 | 1.6506E−03 | −2.7767E−04 | 1.7073E−05 |
| S12 | 1.4311E−03 | −1.9962E−04 | 1.5397E−05 | −4.9084E−07 |
| S13 | −6.5606E−06 | 1.4262E−06 | −1.2666E−07 | 3.9429E−09 |
| S14 | −1.9286E−05 | 1.1638E−06 | −4.1007E−08 | 6.3685E−10 |
| S15 | 2.8238E−06 | −1.0470E−07 | 2.2074E−09 | −2.0262E−11 |
| S16 | 4.0648E−07 | −7.2049E−09 | −1.3588E−11 | 1.5747E−12 |

Figure 4A:
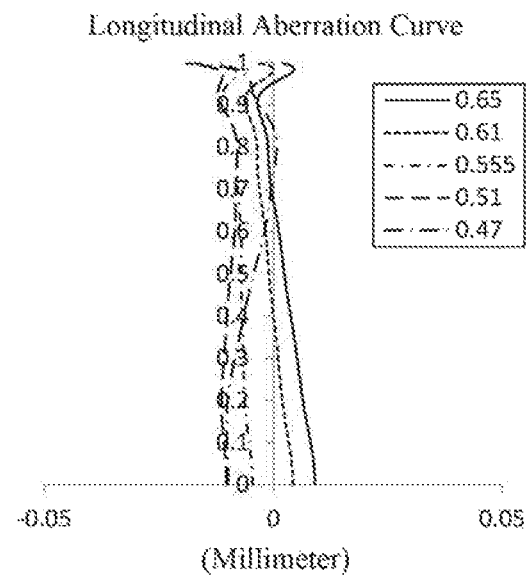
FIGS. 4A to 4D illustrate a longitudinal aberration curve, an astigmatic curve, a distortion curve, and a lateral color curve of the optical imaging lens assembly of the Example 2, respectively.
Figure 4B:
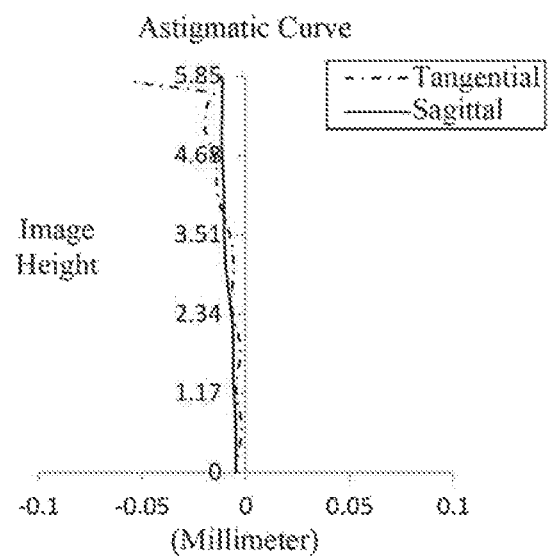
Figure 4C:
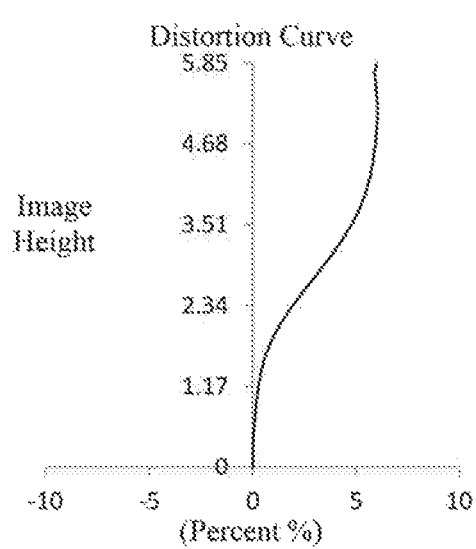
Figure 4D:
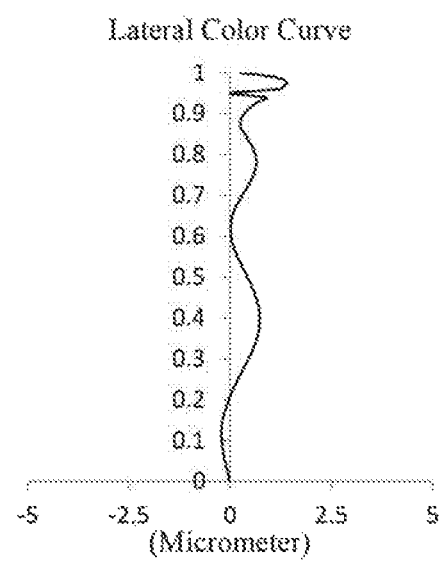

FIG. 4A illustrates a longitudinal aberration curve of the optical imaging lens assembly according to example 2, representing deviations of focal points converged by light of different wavelengths after passing through the lens assembly. FIG. 4B illustrates an astigmatic curve of the optical imaging lens assembly according to example 2, representing a curvature of a tangential plane and a curvature of a sagittal plane. FIG. 4C illustrates a distortion curve of the optical imaging lens assembly according to example 2, representing amounts of distortion corresponding to different image heights. FIG. 4D illustrates a lateral color curve of the optical imaging lens assembly according to example 2, representing deviations of different image heights on an imaging plane after light passes through the lens assembly. It can be seen from FIG. 4A to FIG. 4D that the optical imaging lens assembly provided in example 2 may achieve good image quality.

Example 3

Figure 5:
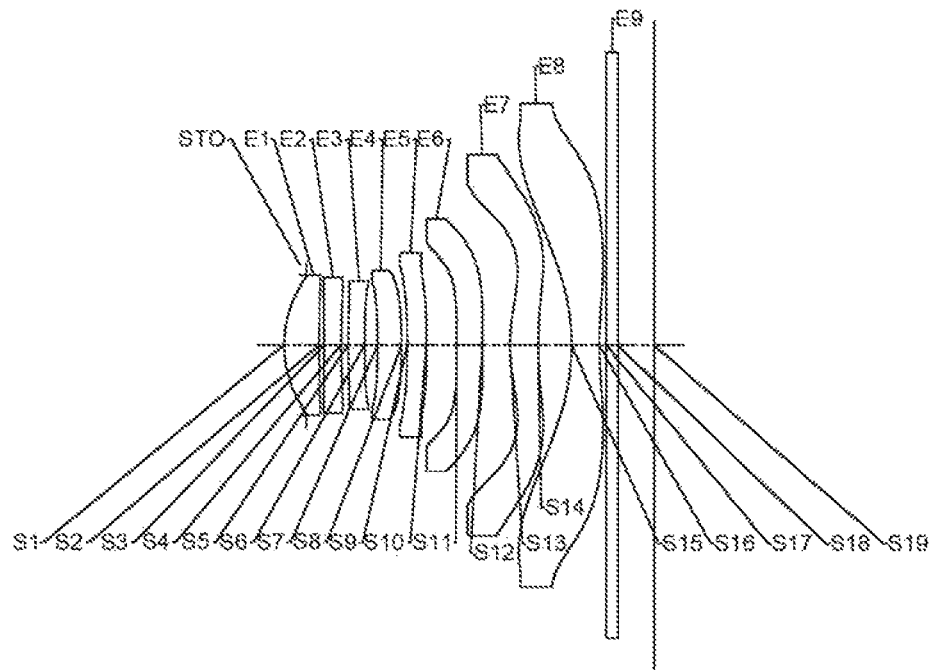
FIG. 5 illustrates a schematic structural view of an optical imaging lens assembly according to Example 3 of the present disclosure.

An optical imaging lens assembly according to example 3 of the present disclosure is described below with reference to FIG. 5 to FIG. 6D. FIG. 5 shows a schematic structural view of the optical imaging lens assembly according to example 3 of the present disclosure.

As shown in FIG. 5, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a concave surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=6.00 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=42.5° and an aperture number Fno of the optical imaging lens assembly satisfies Fno=2.37.

Table 5 is a table illustrating basic parameters of the optical imaging lens assembly of example 3, wherein the units for the radius of curvature, the thickness/distance and the focal length are millimeter (mm).

TABLE 5

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4040 | | | | |
| S1 | Aspheric | 2.0754 | 0.6334 | 1.55 | 56.1 | 4.23 | −0.0956 |
| S2 | Aspheric | 18.2994 | 0.0930 | | | | −41.8680 |
| S3 | Aspheric | −50.0000 | 0.3000 | 1.67 | 20.4 | −10.98 | −99.0000 |
| S4 | Aspheric | 8.5848 | 0.1307 | | | | −99.0000 |
| S5 | Aspheric | 12.0270 | 0.3000 | 1.67 | 20.4 | 87.86 | −31.7749 |
| S6 | Aspheric | 14.9894 | 0.2369 | | | | 28.3900 |
| S7 | Aspheric | −13.2916 | 0.4346 | 1.55 | 56.1 | 37.66 | 50.0000 |
| S8 | Aspheric | −8.1660 | 0.1007 | | | | 21.7837 |
| S9 | Aspheric | −39.8249 | 0.3452 | 1.62 | 23.5 | −42.79 | −99.0000 |
| S10 | Aspheric | 89.5084 | 0.5449 | | | | 50.0000 |
| S11 | Aspheric | 30.0000 | 0.4667 | 1.67 | 20.4 | −27.91 | −92.6051 |
| S12 | Aspheric | 11.4033 | 0.5008 | | | | −88.8576 |
| S13 | Aspheric | 3.0262 | 0.5120 | 1.55 | 56.1 | 8.61 | −9.2585 |
| S14 | Aspheric | 7.9806 | 0.6053 | | | | 0.0725 |
| S15 | Aspheric | −4.7259 | 0.5000 | 1.54 | 55.9 | −4.51 | −0.0535 |
| S16 | Aspheric | 5.1379 | 0.1308 | | | | −33.6353 |
| S17 | Spherical | Infinite | 0.2100 | 1.52 | 64.2 | | |
| S18 | Spherical | Infinite | 0.6550 | | | | |
| S19 | Spherical | Infinite | | | | | |

In example 3, the object-side surface and the image-side surface of any one of the first lens E1 to the eighth lens E8 are aspheric. Table 6 below shows high-order coefficients A4, A6, A8, A10, A12, A14, A16, A18 and A20 applicable to each aspheric surface S1 to S16 in example 3.

TABLE 6

| Surface number | A4 | A6 | A8 | A10 | A12 |
|---|---|---|---|---|---|
| S1 | 8.7349E−04 | −2.6918E−03 | 1.2110E−02 | −3.6320E−02 | 5.9804E−02 |
| S2 | −3.8491E−03 | −1.2194E−02 | 3.1654E−02 | −6.2915E−02 | 8.4323E−02 |
| S3 | 2.3264E−03 | −1.7429E−02 | 4.0069E−02 | −6.4279E−02 | 8.5625E−02 |
| S4 | 8.5195E−03 | −4.9943E−02 | 8.3201E−02 | −1.5877E−01 | 2.8332E−01 |
| S5 | −2.2257E−02 | −2.8691E−02 | 4.5527E−02 | −4.8276E−02 | 1.2408E−01 |
| S6 | −6.5750E−04 | −2.1538E−02 | 6.8175E−02 | −1.3663E−01 | 2.6925E−01 |
| S7 | 2.2356E−03 | −1.6702E−03 | −1.4008E−01 | 4.3198E−01 | −7.9417E−01 |
| S8 | −6.5607E−03 | 8.2470E−02 | −2.9449E−01 | 5.3148E−01 | −6.3159E−01 |
| S9 | −7.1043E−02 | 1.3871E−01 | −3.1083E−01 | 4.6875E−01 | −4.7411E−01 |
| S10 | −7.6262E−02 | 8.5295E−02 | −1.2917E−01 | 1.4466E−01 | −1.0985E−01 |
| S11 | −8.1653E−02 | 5.8181E−02 | −4.1609E−02 | 1.1808E−02 | 1.8800E−03 |
| S12 | −9.4416E−02 | 7.0487E−02 | −4.1969E−02 | 1.6447E−02 | −4.3804E−03 |

TABLE 6-continued

| | | | | | |
|---|---|---|---|---|---|
| S13 | −1.5093E−02 | −1.0510E−02 | 3.0338E−03 | −3.3716E−04 | 5.1010E−06 |
| S14 | 2.1077E−02 | −2.8593E−02 | 1.0441E−02 | −2.3286E−03 | 3.4552E−04 |
| S15 | −2.5106E−02 | 1.3772E−02 | −3.3502E−03 | 4.9026E−04 | −4.5049E−05 |
| S16 | −2.8053E−02 | 8.3843E−03 | −1.5806E−03 | 1.8348E−04 | −1.3372E−05 |

| Surface number | A14 | A16 | A18 | A20 |
|---|---|---|---|---|
| S1 | −6.0218E−02 | 3.5932E−02 | −1.1782E−02 | 1.6146E−03 |
| S2 | −7.1109E−02 | 3.4725E−02 | −8.8048E−03 | 8.6874E−04 |
| S3 | −8.1254E−02 | 4.7551E−02 | −1.4999E−02 | 1.9274E−03 |
| S4 | −3.4275E−01 | 2.4876E−01 | −9.8118E−02 | 1.6040E−02 |
| S5 | −1.9197E−01 | 1.5614E−01 | −6.5376E−02 | 1.0926E−02 |
| S6 | −3.1624E−01 | 2.0798E−01 | −6.9718E−02 | 8.9514E−03 |
| S7 | 9.1937E−01 | −6.5208E−01 | 2.5747E−01 | −4.3102E−02 |
| S8 | 4.9642E−01 | −2.4722E−01 | 7.0193E−02 | −8.6613E−03 |
| S9 | 3.2392E−01 | −1.4151E−01 | 3.5256E−02 | −3.8078E−03 |
| S10 | 5.6631E−02 | −1.8237E−02 | 3.2233E−03 | −2.3661E−04 |
| S11 | −3.0905E−03 | 1.1411E−03 | −1.7682E−04 | 9.3784E−06 |
| S12 | 7.4077E−04 | −6.4457E−05 | 9.5034E−07 | 1.5653E−07 |
| S13 | −2.4278E−06 | 1.2901E−06 | −1.5003E−07 | 5.4022E−09 |
| S14 | −3.4126E−05 | 2.1531E−06 | −7.8347E−08 | 1.2477E−09 |
| S15 | 2.6346E−06 | −9.5613E−08 | 1.9692E−09 | −1.7621E−11 |
| S16 | 5.7713E−07 | −1.2261E−08 | 4.2676E−11 | 1.7088E−12 |

Figure 6A:
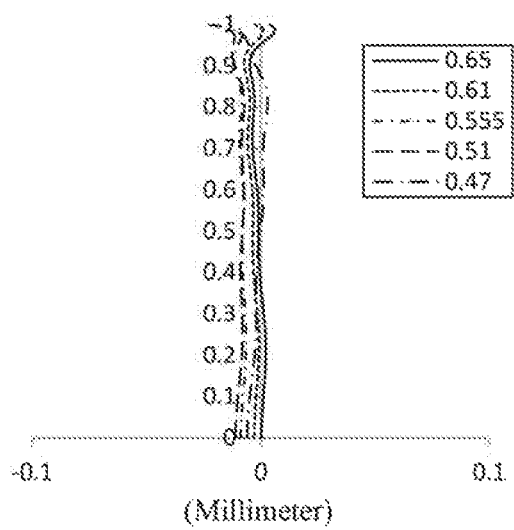
FIGS. 6A to 6D illustrate a longitudinal aberration curve, an astigmatic curve, a distortion curve, and a lateral color curve of the optical imaging lens assembly of the Example 3, respectively.
Figure 6B:
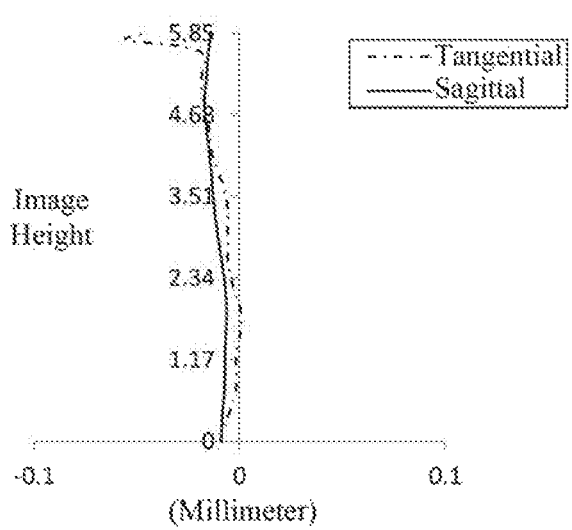
Figure 6C:
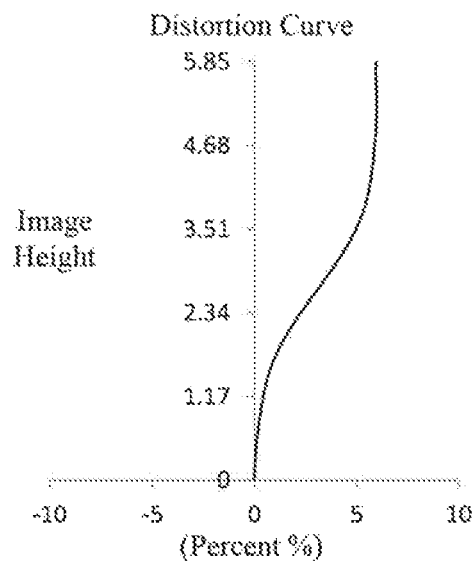
Figure 6D:
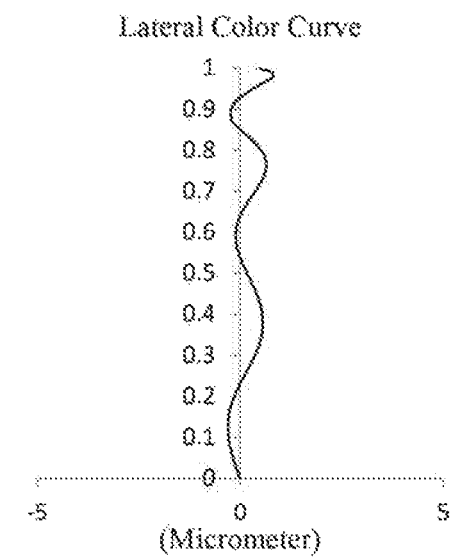

FIG. 6A illustrates a longitudinal aberration curve of the optical imaging lens assembly according to example 3, representing deviations of focal points converged by light of different wavelengths after passing through the lens assembly. FIG. 6B illustrates an astigmatic curve of the optical imaging lens assembly according to example 3, representing a curvature of a tangential plane and a curvature of a sagittal plane. FIG. 6C illustrates a distortion curve of the optical imaging lens assembly according to example 3, representing amounts of distortion corresponding to different image heights. FIG. 6D illustrates a lateral color curve of the optical imaging lens assembly according to example 3, representing deviations of different image heights on an imaging plane after light passes through the lens assembly. It can be seen from FIG. 6A to FIG. 6D that the optical imaging lens assembly provided in example 3 may achieve good image quality.

Example 4

Figure 7:
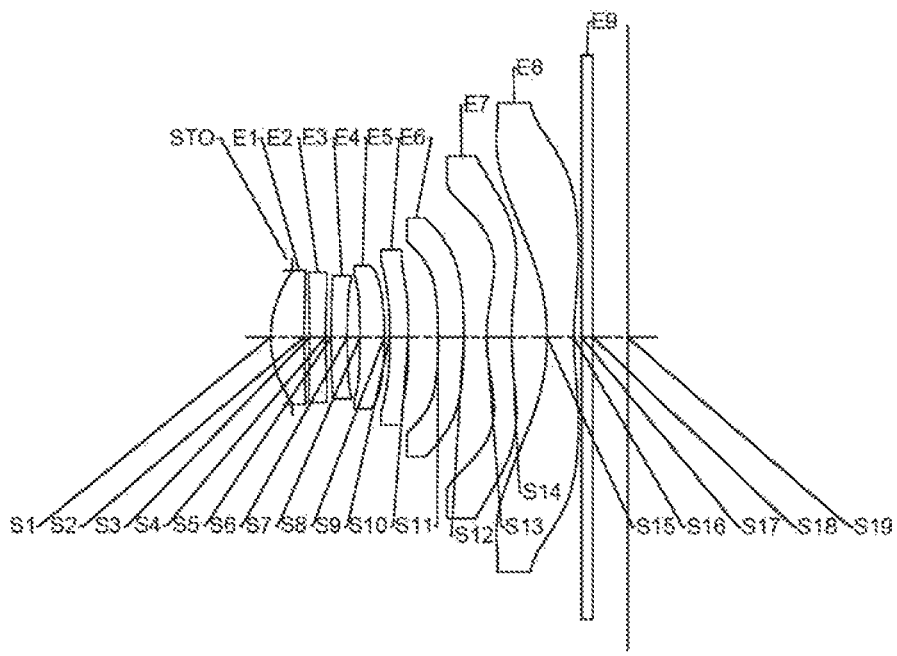
FIG. 7 illustrates a schematic structural view of an optical imaging lens assembly according to Example 4 of the present disclosure.

An optical imaging lens assembly according to example 4 of the present disclosure is described below with reference to FIG. 7 to FIG. 8D. FIG. 7 shows a schematic structural view of the optical imaging lens assembly according to example 4 of the present disclosure.

As shown in FIG. 7, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a concave surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a concave surface, and an image-side surface S12 thereof is a convex surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=5.98 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=42.7° and an aperture number Fno of the optical imaging lens assembly satisfies Fno=2.37.

Table 7 is a table illustrating basic parameters of the optical imaging lens assembly of example 4, wherein the units for the radius of curvature, the thickness/distance and the focal length are millimeter (mm).

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4064 | | | | |
| S1 | Aspheric | 2.0664 | 0.6235 | 1.55 | 56.1 | 4.36 | −0.0739 |
| S2 | Aspheric | 13.9903 | 0.1019 | | | | −45.6690 |
| S3 | Aspheric | −50.0000 | 0.3000 | 1.67 | 20.4 | −11.63 | −99.0000 |
| S4 | Aspheric | 9.1859 | 0.1082 | | | | −99.0000 |
| S5 | Aspheric | 9.2408 | 0.3000 | 1.67 | 20.4 | 83.66 | −85.2845 |
| S6 | Aspheric | 10.9353 | 0.2461 | | | | −8.8026 |
| S7 | Aspheric | −13.0197 | 0.4560 | 1.55 | 56.1 | 27.94 | 50.0000 |
| S8 | Aspheric | −7.1110 | 0.1000 | | | | 20.1591 |
| S9 | Aspheric | −16.8501 | 0.3481 | 1.62 | 23.5 | −52.80 | 20.8350 |
| S10 | Aspheric | −33.6990 | 0.5579 | | | | −99.0000 |
| S11 | Aspheric | −13.2612 | 0.4811 | 1.67 | 20.4 | −27.25 | −99.0000 |
| S12 | Aspheric | −50.0000 | 0.4287 | | | | 50.0000 |
| S13 | Aspheric | 2.9596 | 0.4656 | 1.55 | 56.1 | 8.96 | −8.7406 |
| S14 | Aspheric | 7.0760 | 0.6722 | | | | 0.3632 |
| S15 | Aspheric | −4.6710 | 0.5000 | 1.54 | 55.9 | −4.43 | −0.0562 |
| S16 | Aspheric | 5.0209 | 0.1456 | | | | −28.3409 |
| S17 | Spherical | Infinite | 0.2100 | 1.52 | 64.2 | | |
| S18 | Spherical | Infinite | 0.6550 | | | | |
| S19 | Spherical | Infinite | | | | | |

In example 4, the object-side surface and the image-side surface of any one of the first lens E1 to the eighth lens E8 are aspheric. Table 8 below shows high-order coefficients A4, A6, A8, A10, A12, A14, A16, A18 and A20 applicable to each aspheric surface S1 to S16 in example 4.

Figure 8A:
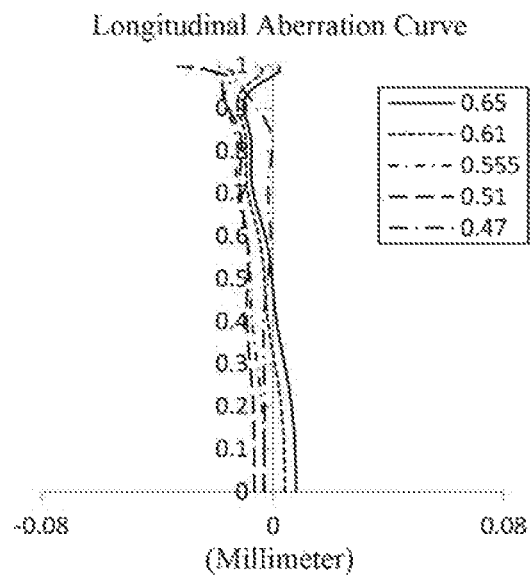
FIGS. 8A to 8D illustrate a longitudinal aberration curve, an astigmatic curve, a distortion curve, and a lateral color curve of the optical imaging lens assembly of the Example 4, respectively.
Figure 8B:
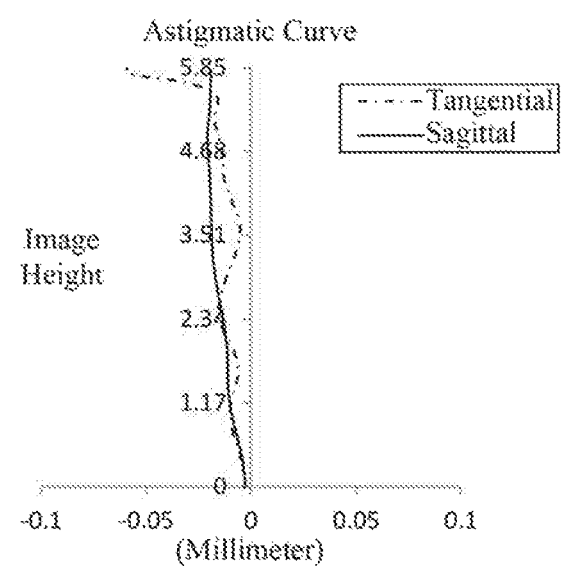

FIG. 8A illustrates a longitudinal aberration curve of the optical imaging lens assembly according to example 4, representing deviations of focal points converged by light of different wavelengths after passing through the lens assembly. FIG. 8B illustrates an astigmatic curve of the optical imaging lens assembly according to example 4, representing

TABLE 8

| Surface number | A4 | A6 | A8 | A10 | A12 |
|---|---|---|---|---|---|
| S1 | 9.5454E−04 | −2.7083E−03 | 1.5737E−02 | −5.1394E−02 | 9.1839E−02 |
| S2 | −5.9860E−03 | −1.0977E−02 | 4.1837E−02 | −1.0202E−01 | 1.6178E−01 |
| S3 | −9.1810E−04 | −1.3916E−02 | 5.6501E−02 | −1.2736E−01 | 2.0140E−01 |
| S4 | −1.7169E−03 | −4.0210E−02 | 7.9830E−02 | −1.6191E−01 | 2.9734E−01 |
| S5 | −2.0041E−02 | −4.5369E−02 | 9.2719E−02 | −1.5982E−01 | 3.1347E−01 |
| S6 | −1.4729E−03 | −2.5335E−02 | 7.9579E−02 | −1.7346E−01 | 3.4837E−01 |
| S7 | −9.5385E−04 | 8.5477E−03 | −1.7031E−01 | 5.0916E−01 | −9.3323E−01 |
| S8 | −1.4296E−02 | 8.0260E−02 | −2.8982E−01 | 5.4642E−01 | −6.6987E−01 |
| S9 | −6.8581E−02 | 9.8992E−02 | −2.2631E−01 | 3.5048E−01 | −3.5760E−01 |
| S10 | −6.2766E−02 | 5.3623E−02 | −8.8194E−02 | 1.0781E−01 | −8.6579E−02 |
| S11 | −5.4672E−02 | 3.3591E−02 | −2.4466E−02 | 2.2353E−03 | 5.6790E−03 |
| S12 | −7.6196E−02 | 5.3963E−02 | −2.9902E−02 | 9.9497E−03 | −1.9232E−03 |
| S13 | −1.4884E−02 | −1.1834E−02 | 3.3641E−03 | −2.3279E−04 | −6.4330E−05 |
| S14 | 2.0834E−02 | −3.1898E−02 | 1.2163E−02 | −2.7730E−03 | 4.1496E−04 |
| S15 | −2.2877E−02 | 1.2194E−02 | −2.8813E−03 | 4.1530E−04 | −3.7769E−05 |
| S16 | −2.5805E−02 | 7.5927E−03 | −1.3974E−03 | 1.5543E−04 | −1.0533E−05 |

Figure 8C:
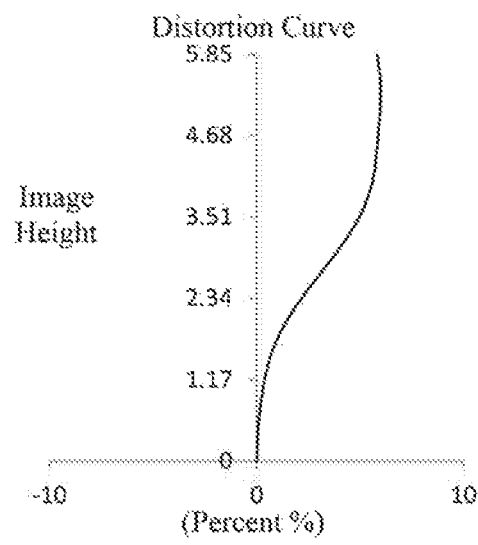
Figure 8D:
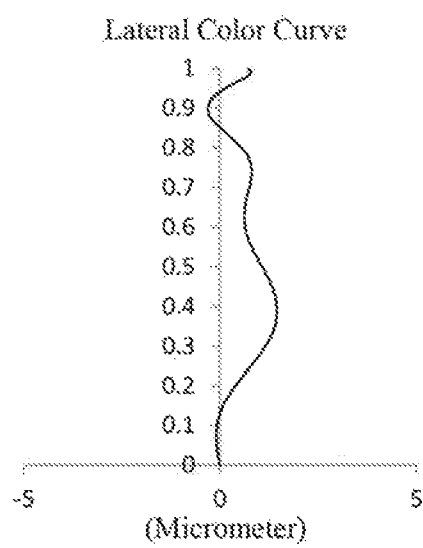

| Surface number | A14 | A16 | A18 | A20 |
|---|---|---|---|---|
| S1 | −9.8557E−02 | 6.2219E−02 | −2.1427E−02 | 3.0865E−03 |
| S2 | −1.6494E−01 | 1.0389E−01 | −3.7233E−02 | 5.8825E−03 |
| S3 | −2.1133E−01 | 1.3779E−01 | −5.0564E−02 | 8.0562E−03 |
| S4 | −3.7307E−01 | 2.8153E−01 | −1.1588E−01 | 1.9947E−02 |
| S5 | −4.1276E−01 | 3.1893E−01 | −1.3335E−01 | 2.3150E−02 |
| S6 | −4.2623E−01 | 2.9905E−01 | −1.1003E−01 | 1.6260E−02 |
| S7 | 1.0809E+00 | −7.6920E−01 | 3.0598E−01 | 5.1799E−02 |
| S8 | 5.4125E−01 | −2.7634E−01 | 8.0137E−02 | 1.0051E−02 |
| S9 | 2.5281E−01 | −1.1681E−01 | 3.0931E−02 | −3.5362E−03 |
| S10 | 4.7523E−02 | −1.6284E−02 | 3.0364E−03 | −2.3316E−04 |
| S11 | −4.0365E−03 | 1.2801E−03 | −1.8676E−04 | 9.3944E−06 |
| S12 | 1.1025E−04 | 4.0400E−05 | −9.2607E−06 | 5.9736E−07 |
| S13 | 1.2173E−05 | −1.7713E−07 | −8.0316E−08 | 4.2060E−09 |
| S14 | −4.0977E−05 | 2.5741E−06 | −9.3242E−08 | 1.4822E−09 |
| S15 | 2.1867E−06 | −7.8381E−08 | 1.5878E−09 | −1.3887E−11 |
| S16 | 3.9402E−07 | −5.2281E−09 | −1.0078E−10 | 2.8777E−12 | a curvature of a tangential plane and a curvature of a sagittal plane. FIG. 8C illustrates a distortion curve of the optical imaging lens assembly according to example 4, representing amounts of distortion corresponding to different image heights. FIG. 8D illustrates a lateral color curve of the optical imaging lens assembly according to example 4, representing deviations of different image heights on an imaging plane after light passes through the lens assembly. It can be seen from FIG. 8A to FIG. 8D that the optical imaging lens assembly provided in example 4 may achieve good image quality.

Example 5

Figure 9:
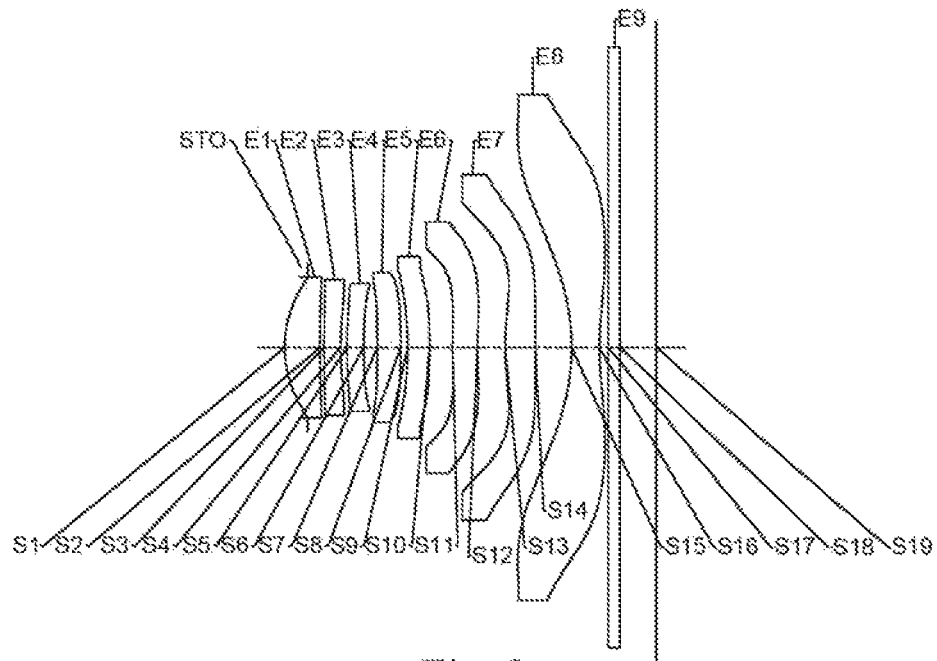
FIG. 9 illustrates a schematic structural view of an optical imaging lens assembly according to Example 5 of the present disclosure.

An optical imaging lens assembly according to example 5 of the present disclosure is described below with reference to FIG. 9 to FIG. 10D. FIG. 9 shows a schematic structural view of the optical imaging lens assembly according to example 5 of the present disclosure.

As shown in FIG. 9, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a concave surface, and an image-side surface S10 thereof is a convex surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a convex surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=6.00 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=42.6° and an aperture number Fno of the optical imaging lens assembly satisfies Fno=2.37.

Table 9 is a table illustrating basic parameters of the optical imaging lens assembly of example 5, wherein the units for the radius of curvature, the thickness/distance and the focal length are millimeter (mm).

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4158 | | | | |
| S1 | Aspheric | 2.0666 | 0.6315 | 1.55 | 56.1 | 4.41 | −0.0442 |
| S2 | Aspheric | 12.9688 | 0.0779 | | | | −59.3232 |
| S3 | Aspheric | 19.5055 | 0.3000 | 1.67 | 20.4 | −11.61 | −30.2873 |
| S4 | Aspheric | 5.5006 | 0.1142 | | | | −74.8397 |
| S5 | Aspheric | 7.1845 | 0.3000 | 1.67 | 20.4 | 122.24 | −13.7944 |
| S6 | Aspheric | 7.7487 | 0.2478 | | | | 20.5882 |
| S7 | Aspheric | −39.7313 | 0.4256 | 1.55 | 56.1 | 31.23 | 50.0000 |
| S8 | Aspheric | −11.9744 | 0.1187 | | | | 49.2336 |
| S9 | Aspheric | −9.0845 | 0.3995 | 1.62 | 23.5 | −35.99 | 34.7804 |
| S10 | Aspheric | −15.2044 | 0.4124 | | | | −99.0000 |
| S11 | Aspheric | 10.6650 | 0.4500 | 1.67 | 20.4 | −34.57 | −93.4117 |
| S12 | Aspheric | 7.1646 | 0.4960 | | | | −22.6676 |
| S13 | Aspheric | 4.4481 | 0.5447 | 1.55 | 56.1 | 7.51 | −10.3690 |
| S14 | Aspheric | −50.0000 | 0.6544 | | | | −96.7973 |
| S15 | Aspheric | −4.7287 | 0.5000 | 1.54 | 55.9 | −4.17 | −0.0513 |
| S16 | Aspheric | 4.4139 | 0.1624 | | | | −26.8322 |
| S17 | Spherical | Infinite | 0.2100 | 1.52 | 64.2 | | |
| S18 | Spherical | Infinite | 0.6550 | | | | |
| S19 | Spherical | Infinite | | | | | |

In example 5, the object-side surface and the image-side surface of any one of the first lens E1 to the eighth lens E8 are aspheric. Table 10 below shows high-order coefficients A4, A6, A8, A10, A12, A14, A16, A18 and A20 applicable to each aspheric surface S1 to S16 in example 5.

TABLE 10

| Surface number | A4 | A6 | A8 | A10 | A12 |
|---|---|---|---|---|---|
| S1 | 4.6373E−04 | −2.5647E−03 | 1.3249E−02 | −3.8807E−02 | 6.5067E−02 |
| S2 | −1.5436E−02 | 1.1019E−02 | −1.3548E−02 | 3.3955E−02 | −6.1631E−02 |
| S3 | −2.1724E−02 | 1.6320E−02 | −1.9667E−02 | 5.0802E−02 | −9.5706E−02 |
| S4 | 3.1868E−02 | −7.6467E−02 | 9.4205E−02 | −1.2262E−01 | 1.4415E−01 |
| S5 | −1.7856E−02 | −1.3916E−02 | −5.8471E−03 | 6.3120E−02 | −1.0779E−01 |
| S6 | −5.9882E−03 | −3.7270E−03 | 9.0357E−03 | 2.1580E−02 | −4.3183E−02 |
| S7 | −1.0923E−02 | −1.9776E−02 | 1.9336E−02 | −5.8972E−02 | 1.1098E−01 |
| S8 | −1.0500E−02 | 5.5274E−02 | −2.4304E−01 | 5.0608E−01 | −6.7394E−01 |
| S9 | −3.4316E−02 | 8.3150E−02 | −2.4195E−01 | 4.3649E−01 | −5.1104E−01 |
| S10 | −5.9702E−02 | 5.5373E−02 | −9.3732E−02 | 1.0732E−01 | −8.0056E−02 |
| S11 | −7.5974E−02 | 5.1455E−02 | −4.0227E−02 | 1.2908E−02 | 1.4975E−03 |
| S12 | −8.6010E−02 | 5.5951E−02 | −3.2656E−02 | 1.2866E−02 | −3.4632E−03 |
| S13 | −2.4463E−02 | −1.0424E−02 | 3.7452E−03 | −1.5003E−03 | 8.0616E−04 |
| S14 | 2.6000E−02 | −2.5268E−02 | 6.7225E−03 | −7.3057E−04 | −2.0633E−05 |
| S15 | −2.5486E−02 | 1.4109E−02 | −3.4763E−03 | 5.1390E−04 | −4.7519E−05 |
| S16 | −2.5082E−02 | 7.2904E−03 | −1.3440E−03 | 1.5039E−04 | −1.0473E−05 |

| Surface number | A14 | A16 | A18 | A20 |
|---|---|---|---|---|
| S1 | −6.6574E−02 | 4.0623E−02 | −1.3645E−02 | 1.9334E−03 |
| S2 | 6.6494E−02 | −4.1850E−02 | 1.3979E−02 | −1.8527E−03 |
| S3 | 1.0900E−01 | −7.3849E−02 | 2.7396E−02 | −4.2369E−03 |
| S4 | −1.2457E−01 | 6.8132E−02 | −2.0303E−02 | 2.2914E−03 |
| S5 | 1.3218E−01 | −1.1033E−01 | 5.2088E−02 | −1.0548E−02 |
| S6 | 7.2209E−02 | −7.7216E−02 | 4.3095E−02 | −9.4837E−03 |
| S7 | −1.2464E−01 | 8.5075E−02 | −3.4227E−02 | 6.6557E−03 |
| S8 | 5.7719E−01 | −3.0383E−01 | 8.8759E−02 | −1.1016E−02 |
| S9 | 3.9574E−01 | −1.9014E−01 | 5.0673E−02 | −5.7195E−03 |
| S10 | 3.9526E−02 | −1.1701E−02 | 1.8020E−03 | −1.0697E−04 |
| S11 | −3.5623E−03 | 1.5616E−03 | −3.0792E−04 | 2.4026E−05 |
| S12 | 6.0153E−04 | −5.6279E−05 | 1.3871E−06 | 1.0182E−07 |
| S13 | −2.6108E−04 | 4.4368E−05 | −3.7410E−06 | 1.2407E−07 |
| S14 | 1.3928E−05 | −1.4391E−06 | 6.3040E−08 | −1.0102E−09 |
| S15 | 2.7836E−06 | −1.0070E−07 | 2.0573E−09 | −1.8160E−11 |
| S16 | 4.3442E−07 | −9.1925E−09 | 4.8335E−11 | 8.4444E−13 |

Figures 10A, 10B:
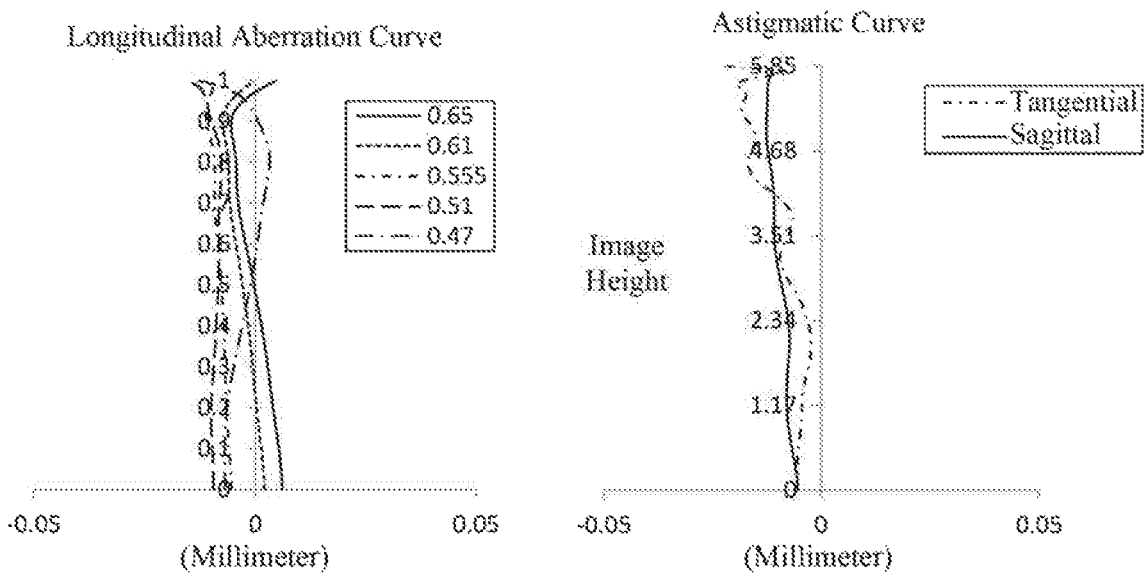
FIGS. 10A to 10D illustrate a longitudinal aberration curve, an astigmatic curve, a distortion curve, and a lateral color curve of the optical imaging lens assembly of the Example 5, respectively.
Figures 10C, 10D:
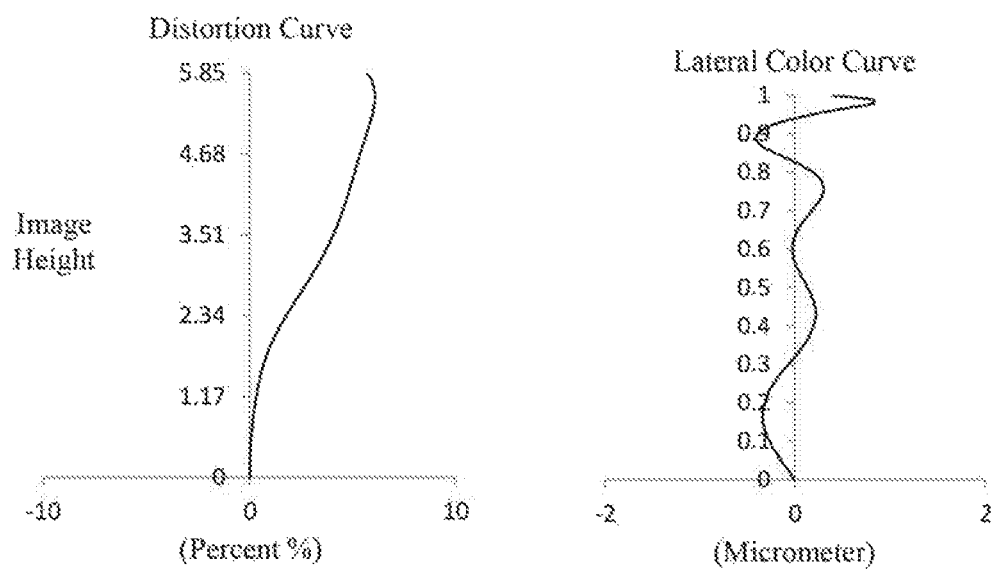

FIG. 10A illustrates a longitudinal aberration curve of the optical imaging lens assembly according to example 5, representing deviations of focal points converged by light of different wavelengths after passing through the lens assembly. FIG. 10B illustrates an astigmatic curve of the optical imaging lens assembly according to example 5, representing a curvature of a tangential plane and a curvature of a sagittal plane. FIG. 10C illustrates a distortion curve of the optical imaging lens assembly according to example 5, representing amounts of distortion corresponding to different image heights. FIG. 10D illustrates a lateral color curve of the optical imaging lens assembly according to example 5, representing deviations of different image heights on an imaging plane after light passes through the lens assembly. It can be seen from FIG. 10A to FIG. 10D that the optical imaging lens assembly provided in example 5 may achieve good image quality.

Example 6

Figure 11:
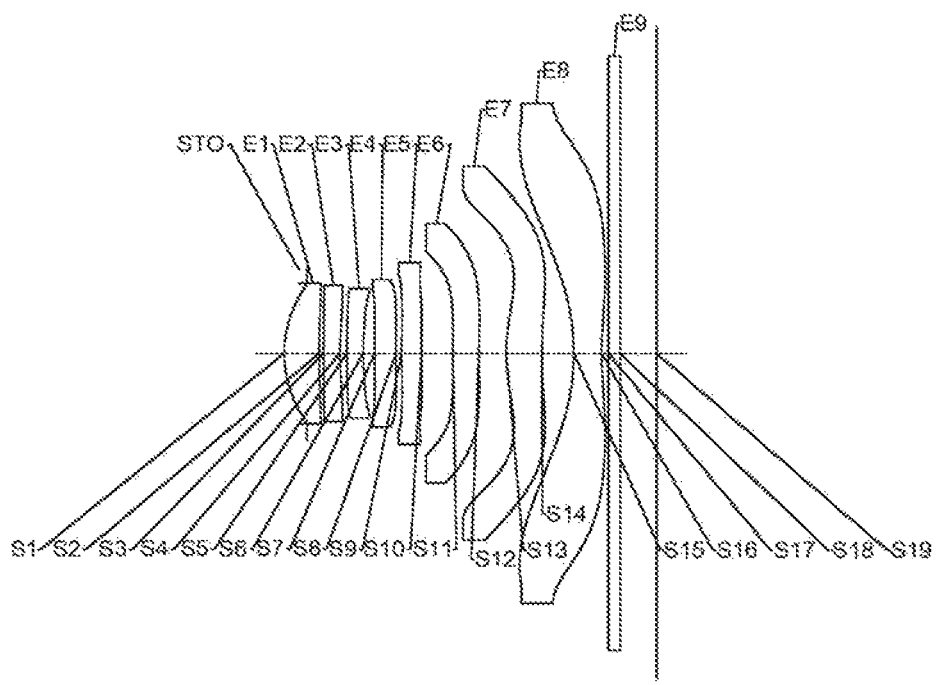
FIG. 11 illustrates a schematic structural view of an optical imaging lens assembly according to Example 6 of the present disclosure.

An optical imaging lens assembly according to example 6 of the present disclosure is described below with reference to FIG. 11 to FIG. 12D. FIG. 11 shows a schematic structural view of the optical imaging lens assembly according to example 6 of the present disclosure.

As shown in FIG. 11, the optical imaging lens assembly includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has negative refractive power, an object-side surface S5 thereof is a convex surface, and an image-side surface S6 thereof is a concave surface. The fourth lens E4 has negative refractive power, an object-side surface S7 thereof is a convex surface, and an image-side surface S8 thereof is a concave surface. The fifth lens E5 has positive refractive power, an object-side surface S9 thereof is a convex surface, and an image-side surface S10 thereof is a concave surface. The sixth lens E6 has negative refractive power, an object-side surface S11 thereof is a convex surface, and an image-side surface S12 thereof is a concave surface. The seventh lens E7 has positive refractive power, an object-side surface S13 thereof is a convex surface, and an image-side surface S14 thereof is a concave surface. The eighth lens E8 has negative refractive power, an object-side surface S15 thereof is a concave surface, and an image-side surface S16 thereof is a concave surface. The optical filter E9 has an object-side surface S17 and an image-side surface S18. Light from an object sequentially passes through the respective surfaces S1 to S18 and is finally imaged on the imaging plane S19.

In this example, a total effective focal length f of the optical imaging lens assembly satisfies f=6.02 mm, a distance TTL along the optical axis from the object-side surface S1 of the first lens E1 to the imaging plane S19 satisfies TTL=6.70 mm, half of a diagonal length ImgH of an effective pixel area on the imaging plane S19 satisfies ImgH=5.85 mm, half of a maximal field-of-view Semi-FOV of the optical imaging lens assembly satisfies Semi-FOV=42.5° and an aperture number Fno of the optical imaging lens assembly satisfies Fno=2.38.

Table 11 is a table illustrating basic parameters of the optical imaging lens assembly of example 6, wherein the units for the radius of curvature, the thickness/distance and the focal length are millimeter (mm).

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.4118 | | | | |
| S1 | Aspheric | 2.0662 | 0.6272 | 1.55 | 56.1 | 4.42 | −0.0805 |
| S2 | Aspheric | 12.7878 | 0.0780 | | | | −65.3636 |
| S3 | Aspheric | 20.3618 | 0.3000 | 1.67 | 20.4 | −14.47 | −28.0991 |
| S4 | Aspheric | 6.5010 | 0.1189 | | | | −99.0000 |
| S5 | Aspheric | 10.4196 | 0.3000 | 1.67 | 20.4 | −51.05 | −7.5810 |
| S6 | Aspheric | 7.8828 | 0.2006 | | | | 24.0191 |
| S7 | Aspheric | 84.2574 | 0.3872 | 1.55 | 56.1 | −226.16 | −99.0000 |
| S8 | Aspheric | 50.0000 | 0.1000 | | | | −95.9159 |
| S9 | Aspheric | 9.8096 | 0.3592 | 1.62 | 23.5 | 48.08 | −95.6870 |
| S10 | Aspheric | 14.1578 | 0.5658 | | | | 40.5081 |
| S11 | Aspheric | 20.5045 | 0.4648 | 1.67 | 20.4 | −17.93 | 35.5021 |
| S12 | Aspheric | 7.4772 | 0.4920 | | | | −99.0000 |
| S13 | Aspheric | 3.0396 | 0.6461 | 1.55 | 56.1 | 6.96 | −9.8124 |
| S14 | Aspheric | 14.0938 | 0.5696 | | | | 1.1370 |
| S15 | Aspheric | −4.7539 | 0.5000 | 1.54 | 55.9 | −4.50 | −0.0537 |
| S16 | Aspheric | 5.0896 | 0.1257 | | | | −39.1942 |
| S17 | Spherical | Infinite | 0.2100 | 1.52 | 64.2 | | |
| S18 | Spherical | Infinite | 0.6550 | | | | |
| S19 | Spherical | Infinite | | | | | |

In example 6, the object-side surface and the image-side surface of any one of the first lens E1 to the eighth lens E8 are aspheric. Table 12 below shows high-order coefficients A4, A6, A8, A10, A12, A14, A16, A18 and A20 applicable to each aspheric surface S1 to S16 in example 6.

TABLE 12

| Surface number | A4 | A6 | A8 | A10 | A12 |
|---|---|---|---|---|---|
| S1 | 9.6694E−04 | −5.6334E−03 | 2.2932E−02 | −5.9391E−02 | 9.1857E−02 |
| S2 | −7.9907E−03 | −9.2431E−04 | −9.7551E−03 | 4.5710E−02 | −9.0757E−02 |
| S3 | −1.2194E−02 | −4.4875E−03 | 2.7146E−03 | 2.7227E−02 | −6.3244E−02 |
| S4 | 2.2999E−02 | −7.9150E−02 | 1.1490E−01 | −1.7080E−01 | 2.5771E−01 |
| S5 | −2.3875E−02 | −2.5438E−02 | 5.1990E−02 | −4.9368E−02 | 9.9985E−02 |
| S6 | −3.8977E−03 | −1.1983E−02 | 2.7282E−02 | −5.8720E−03 | 2.6648E−02 |
| S7 | 9.9390E−03 | −9.3639E−03 | −9.3166E−02 | 2.6610E−01 | −4.5909E−01 |
| S8 | −3.3336E−02 | 1.2128E−01 | −3.4927E−01 | 6.1062E−01 | −7.2740E−01 |
| S9 | −8.1069E−02 | 1.5185E−01 | −3.2943E−01 | 5.0957E−01 | −5.3507E−01 |
| S10 | −7.4430E−02 | 8.0735E−02 | −1.3086E−01 | 1.5796E−01 | −1.2872E−01 |
| S11 | −8.7352E−02 | 6.9253E−02 | −5.3635E−02 | 2.4007E−02 | −6.4144E−03 |
| S12 | −8.8094E−02 | 6.5439E−02 | −3.9361E−02 | 1.6941E−02 | −5.4480E−03 |
| S13 | −1.5662E−02 | −8.9905E−03 | 2.2351E−03 | −1.0557E−04 | −3.5989E−05 |
| S14 | 2.4948E−02 | −2.7015E−02 | 9.0288E−03 | −1.9092E−03 | 2.7534E−04 |
| S15 | −2.5414E−02 | 1.4221E−02 | −3.5634E−03 | 5.4033E−04 | −5.1770E−05 |
| S16 | −2.8398E−02 | 8.3955E−03 | −1.4795E−03 | 1.5975E−04 | −1.1055E−05 |

| Surface number | A14 | A16 | A18 | A20 |
|---|---|---|---|---|
| S1 | −8.9237E−02 | 5.2613E−02 | −1.7241E−02 | 2.3928E−03 |
| S2 | 1.0330E−01 | −6.9048E−02 | 2.4744E−02 | −3.6154E−03 |
| S3 | 7.3706E−02 | −5.1365E−02 | 1.9829E−02 | −3.1843E−03 |
| S4 | −2.8512E−01 | 1.9060E−01 | −6.8484E−02 | 1.0125E−02 |
| S5 | −1.4493E−01 | 1.0772E−01 | −3.9369E−02 | 5.5174E−03 |
| S6 | −5.4718E−02 | 4.1036E−02 | −1.1291E−02 | 4.1168E−04 |
| S7 | 5.1041E−01 | −3.5600E−01 | 1.4033E−01 | −2.3582E−02 |
| S8 | 5.7477E−01 | −2.8858E−01 | 8.3004E−02 | −1.0419E−02 |
| S9 | 3.7652E−01 | −1.6862E−01 | 4.3101E−02 | −4.7922E−03 |

TABLE 12-continued

| | | | | |
|---|---|---|---|---|
| S10 | 7.0108E−02 | −2.3566E−02 | 4.3244E−03 | −3.2907E−04 |
| S11 | 4.3503E−04 | 2.2656E−04 | −4.4025E−05 | 1.1069E−06 |
| S12 | 1.2312E−03 | −1.7640E−04 | 1.4039E−05 | −4.6732E−07 |
| S13 | 2.3691E−06 | 8.8757E−07 | −1.2664E−07 | 4.7364E−09 |
| S14 | −2.6972E−05 | 1.7193E−06 | −6.4311E−08 | 1.0695E−09 |
| S15 | 3.1711E−06 | −1.2090E−07 | 2.6220E−09 | −2.4769E−11 |
| S16 | 4.7975E−07 | −1.2049E−08 | 1.4785E−10 | −5.4377E−13 |

Figure 12A:
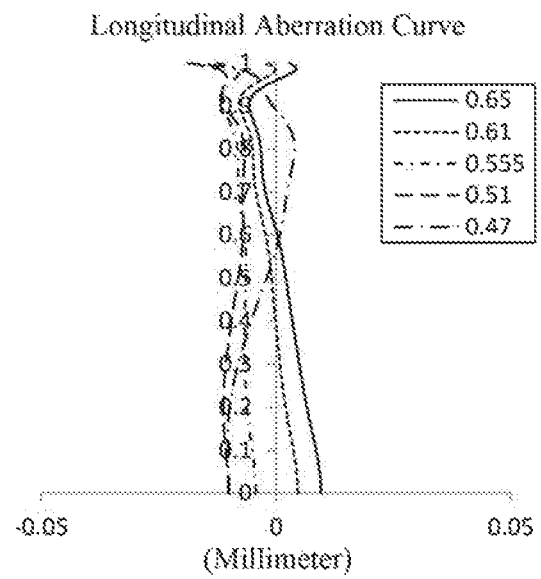
FIGS. 12A to 12D illustrate a longitudinal aberration curve, an astigmatic curve, a distortion curve, and a lateral color curve of the optical imaging lens assembly of the Example 6, respectively.
Figure 12B:
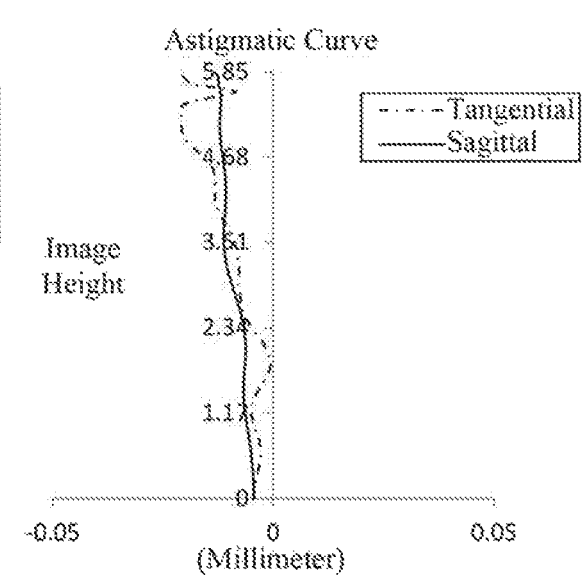
Figure 12C:
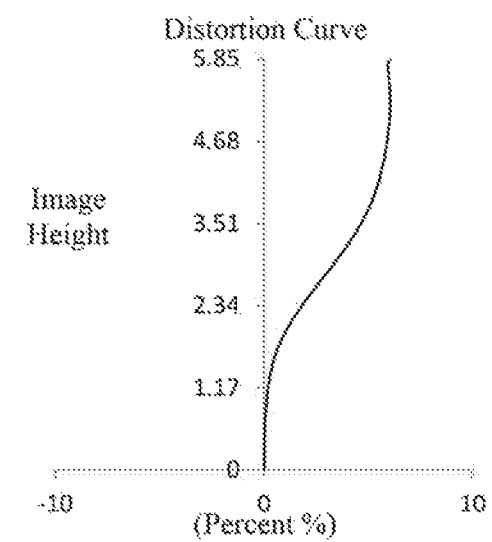
Figure 12D:
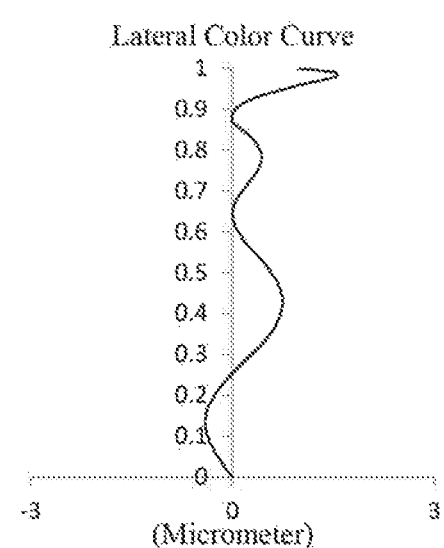

FIG. 12A illustrates a longitudinal aberration curve of the optical imaging lens assembly according to example 6, representing deviations of focal points converged by light of different wavelengths after passing through the lens assembly. FIG. 12B illustrates an astigmatic curve of the optical imaging lens assembly according to example 6, representing a curvature of a tangential plane and a curvature of a sagittal plane. FIG. 12C illustrates a distortion curve of the optical imaging lens assembly according to example 6, representing amounts of distortion corresponding to different image heights. FIG. 12D illustrates a lateral color curve of the optical imaging lens assembly according to example 6, representing deviations of different image heights on an imaging plane after light passes through the lens assembly. It can be seen from FIG. 12A to FIG. 12D that the optical imaging lens assembly provided in example 6 may achieve good image quality.

In view of the above, examples 1 to 6 respectively satisfy the relationship shown in Table 13.

TABLE 13

| Condition | Example | | | | | |
|---|---|---|---|---|---|---|
| | 1 | 2 | 3 | 4 | 5 | 6 |
| TTL/ImgH | 1.08 | 1.08 | 1.08 | 1.08 | 1.07 | 1.07 |
| f7/f | 1.51 | 1.27 | 1.44 | 1.50 | 1.25 | 1.16 |
| R16/R13 | 1.92 | 1.66 | 1.70 | 1.70 | 0.99 | 1.67 |
| R2/f | 1.61 | 2.38 | 3.05 | 2.34 | 2.16 | 2.13 |
| CT4/T45 | 2.49 | 3.93 | 4.31 | 4.56 | 3.59 | 3.87 |
| (R4 + R2)/(R2 − R4) | 3.00 | 2.49 | 2.77 | 4.82 | 2.47 | 3.07 |
| (CT5 + CT7)/(CT7 − CT5) | 6.06 | 4.05 | 5.14 | 6.93 | 6.50 | 3.50 |
| (SAG62 + SAG61)/(SAG62 − SAG61) | 15.46 | 10.59 | 10.21 | 9.83 | 19.69 | 9.46 |
| DT82/ImgH | 0.77 | 0.76 | 0.75 | 0.75 | 0.78 | 0.77 |
| ΣAT/TD | 0.39 | 0.38 | 0.39 | 0.39 | 0.37 | 0.37 |

The foregoing is only a description of the preferred examples of the present disclosure and the applied technical principles. It should be appreciated by those skilled in the art that the scope of the invention of the present disclosure is not limited to the technical solutions formed by the particular combinations of the above technical features. The scope of the invention should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens assembly, sequentially from an object side to an image side of the optical imaging lens assembly along an optical axis, comprising:
   a first lens having positive refractive power with a convex object-side surface and a concave image-side surface;
   a second lens having negative refractive power with a concave image-side surface;
   a third lens having refractive power with a convex object-side surface and a concave image-side surface;
   a fourth lens having refractive power;
   a fifth lens having refractive power;
   a sixth lens having refractive power;
   a seventh lens having positive refractive power with a convex object-side surface; and
   an eighth lens having negative refractive power with a concave object-side surface and a concave image-side surface,
   wherein 5.80 mm<ImgH,
   TTL/ImgH<1.10, and
   1.00<f7/f<2.00,
   where ImgH is half of a diagonal length of an effective pixel area on an imaging plane of the optical imaging lens assembly, TTL is a distance along the optical axis from the object-side surface of the first lens to the imaging plane of the optical imaging lens assembly, f7 is an effective focal length of the seventh lens, and f is a total effective focal length of the optical imaging lens assembly.

2. The optical imaging lens assembly according to claim 1, wherein 0.50<R16/R13<2.00,
   where R13 is a radius of curvature of the object-side surface of the seventh lens, and R16 is a radius of curvature of the image-side surface of the eighth lens.

3. The optical imaging lens assembly according to claim 1, wherein 1.00<R2/f<3.50,
   where R2 is a radius of curvature of the image-side surface of the first lens, and f is the total effective focal length of the optical imaging lens assembly.

4. The optical imaging lens assembly according to claim 1, wherein 2.00<CT4/T45<5.00,
   where CT4 is a center thickness of the fourth lens along the optical axis, and T45 is a spaced interval between the fourth lens and the fifth lens along the optical axis.

5. The optical imaging lens assembly according to claim 1, wherein 2.00<(R4+R2)/(R2-R4)<5.00,
   where R2 is a radius of curvature of the image-side surface of the first lens, and R4 is a radius of curvature of the image-side surface of the second lens.

6. The optical imaging lens assembly according to claim 1, wherein 9.00<(SAG62+SAG61)/(SAG62-SAG61)<20.00,
   where SAG61 is an on-axis distance from an intersection of an object-side surface of the sixth lens and the optical axis to a vertex of an effective radius of the object-side surface of the sixth lens, and SAG62 is an on-axis distance from an intersection of an image-side surface of the sixth lens and the optical axis to a vertex of an effective radius of the image-side surface of the sixth lens.

7. The optical imaging lens assembly according to claim 1, wherein 0.74<DT82/ImgH, where DT82 is a maximum effective radius of the image-side surface of the eighth lens.

8. The optical imaging lens assembly according to claim 1, wherein $\Sigma AT/TD<0.40$,
where $\Sigma AT$ is a sum of spaced intervals along the optical axis between each two adjacent lenses of the first lens to the eighth lens, and TD is a distance along the optical axis from the object-side surface of the first lens to the image-side surface of the eighth lens.

9. The optical imaging lens assembly according to claim 1, wherein the optical imaging lens assembly further comprises a stop disposed between the object side and the first lens.

10. The optical imaging lens assembly according to claim 1, wherein
$3.00<(CT5+CT7)/(CT7-CT5)<7.00$,
where CT5 is a center thickness of the fifth lens along the optical axis, and CT7 is a center thickness of the seventh lens along the optical axis.

11. The optical imaging lens assembly according to claim 10, wherein $0.50<R16/R13<2.00$,
where R13 is a radius of curvature of the object-side surface of the seventh lens, and R16 is a radius of curvature of the image-side surface of the eighth lens.

12. The optical imaging lens assembly according to claim 10, wherein $1.00<R2/f<3.50$,
where R2 is a radius of curvature of the image-side surface of the first lens, and f is a total effective focal length of the optical imaging lens assembly.

13. The optical imaging lens assembly according to claim 10, wherein $2.00<CT4/T45<5.00$,
where CT4 is a center thickness of the fourth lens along the optical axis, and T45 is a spaced interval between the fourth lens and the fifth lens along the optical axis.

14. The optical imaging lens assembly according to claim 10, wherein $2.00<(R4+R2)/(R2-R4)<5.00$,
where R2 is a radius of curvature of the image-side surface of the first lens, and R4 is a radius of curvature of the image-side surface of the second lens.

15. The optical imaging lens assembly according to claim 10, wherein $9.00<(SAG62+SAG61)/(SAG62-SAG61)<20.00$,
where SAG61 is an on-axis distance from an intersection of an object-side surface of the sixth lens and the optical axis to a vertex of an effective radius of the object-side surface of the sixth lens, and SAG62 is an on-axis distance from an intersection of an image-side surface of the sixth lens and the optical axis to a vertex of an effective radius of the image-side surface of the sixth lens.

16. The optical imaging lens assembly according to claim 10, wherein $0.74<DT82/ImgH$,
where DT82 is a maximum effective radius of the image-side surface of the eighth lens.

17. The optical imaging lens assembly according to claim 10, wherein $\Sigma AT/TD <0.40$,
where $\Sigma AT$ is a sum of spaced intervals along the optical axis between each two adjacent lenses of the first lens to the eighth lens, and TD is a distance along the optical axis from the object-side surface of the first lens to the image-side surface of the eighth lens.

18. The optical imaging lens assembly according to claim 10, wherein the optical imaging lens assembly further comprises a stop disposed between the object side and the first lens.

* * * * *